Jan. 16, 1940.  B. C. COONS  2,187,075
FRUIT PREPARATION MACHINE
Filed May 3, 1937  15 Sheets-Sheet 3

INVENTOR.
BURTON C. COONS
BY Philip A. Minnis
ATTORNEY

Jan. 16, 1940.　　B. C. COONS　　2,187,075
FRUIT PREPARATION MACHINE
Filed May 3, 1937　　15 Sheets-Sheet 5

INVENTOR.
BURTON C. COONS
BY Philip G. Minnis
ATTORNEY

Jan. 16, 1940.                B. C. COONS                2,187,075
                        FRUIT PREPARATION MACHINE
                    Filed May 3, 1937          15 Sheets-Sheet 6
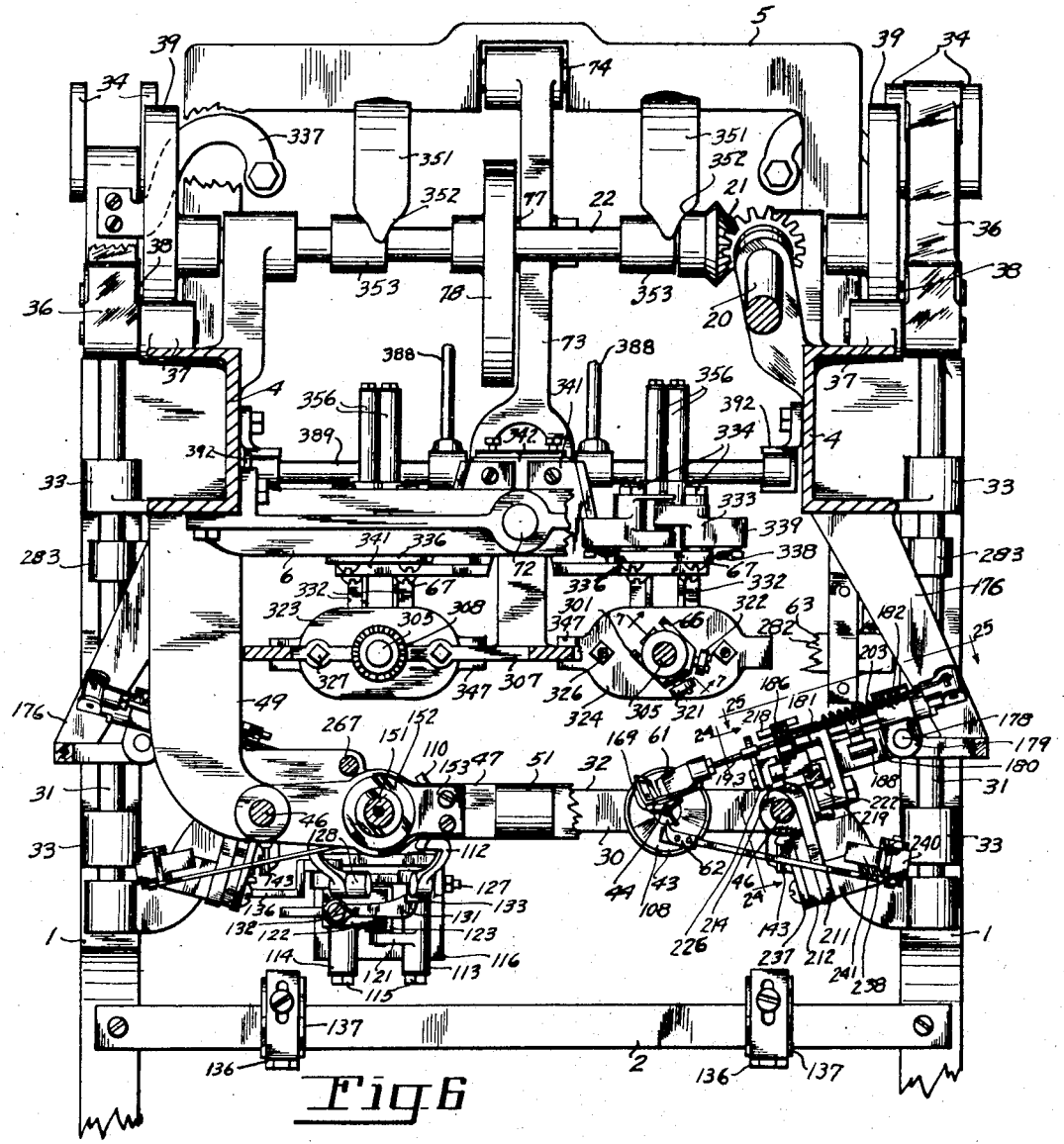
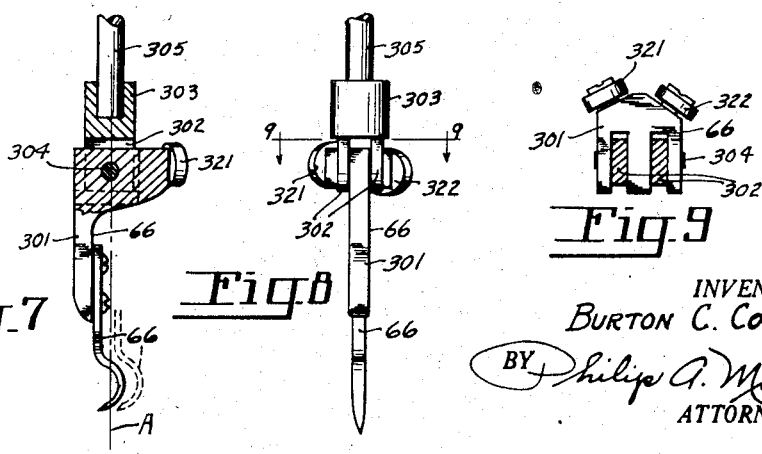
INVENTOR.
BURTON C. COONS
BY Philip A. Minnis
ATTORNEY

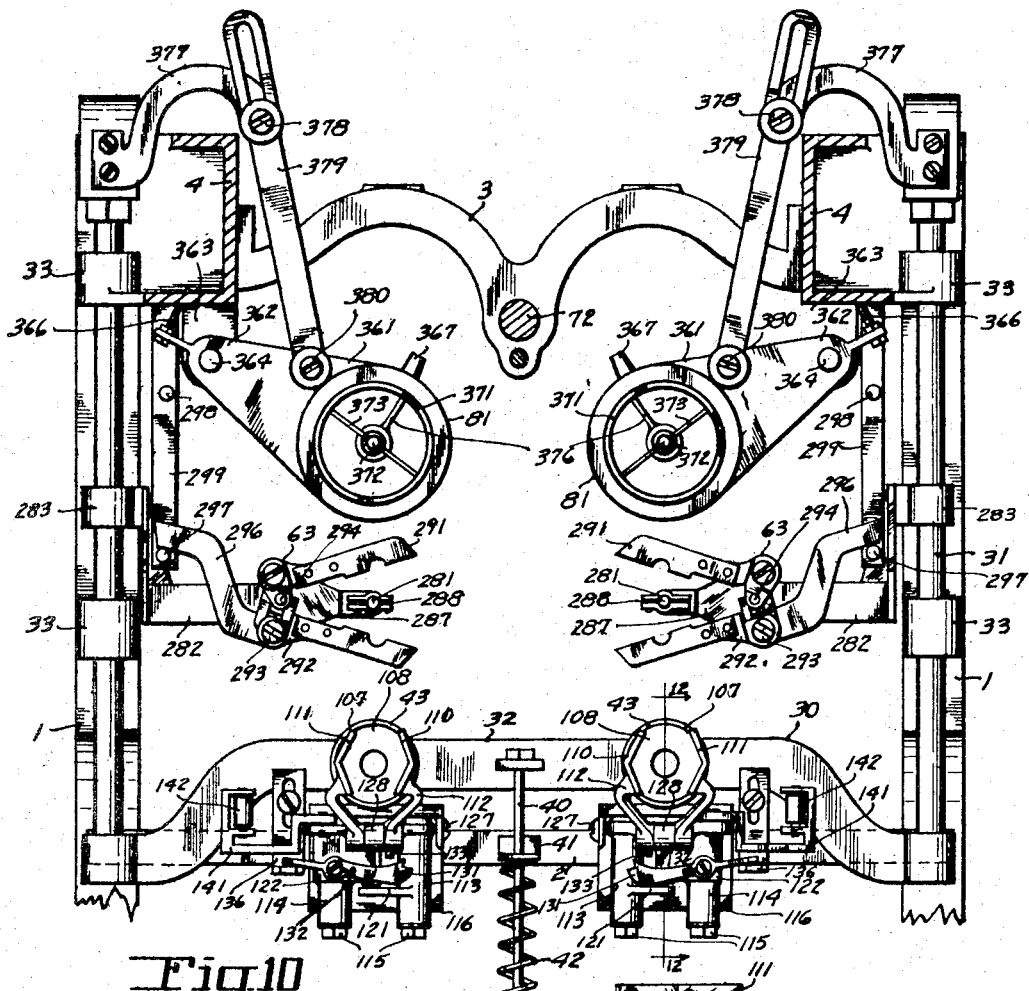
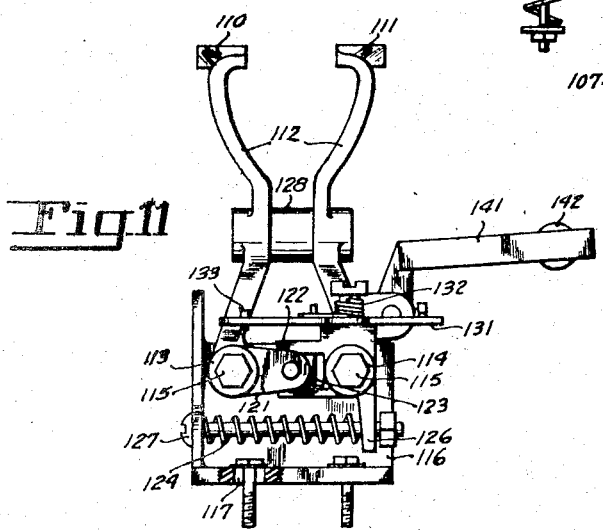
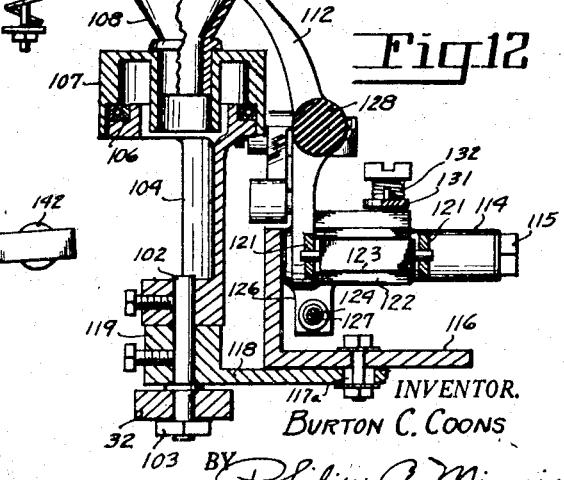

Jan. 16, 1940.   B. C. COONS   2,187,075
FRUIT PREPARATION MACHINE
Filed May 3, 1937   15 Sheets-Sheet 8
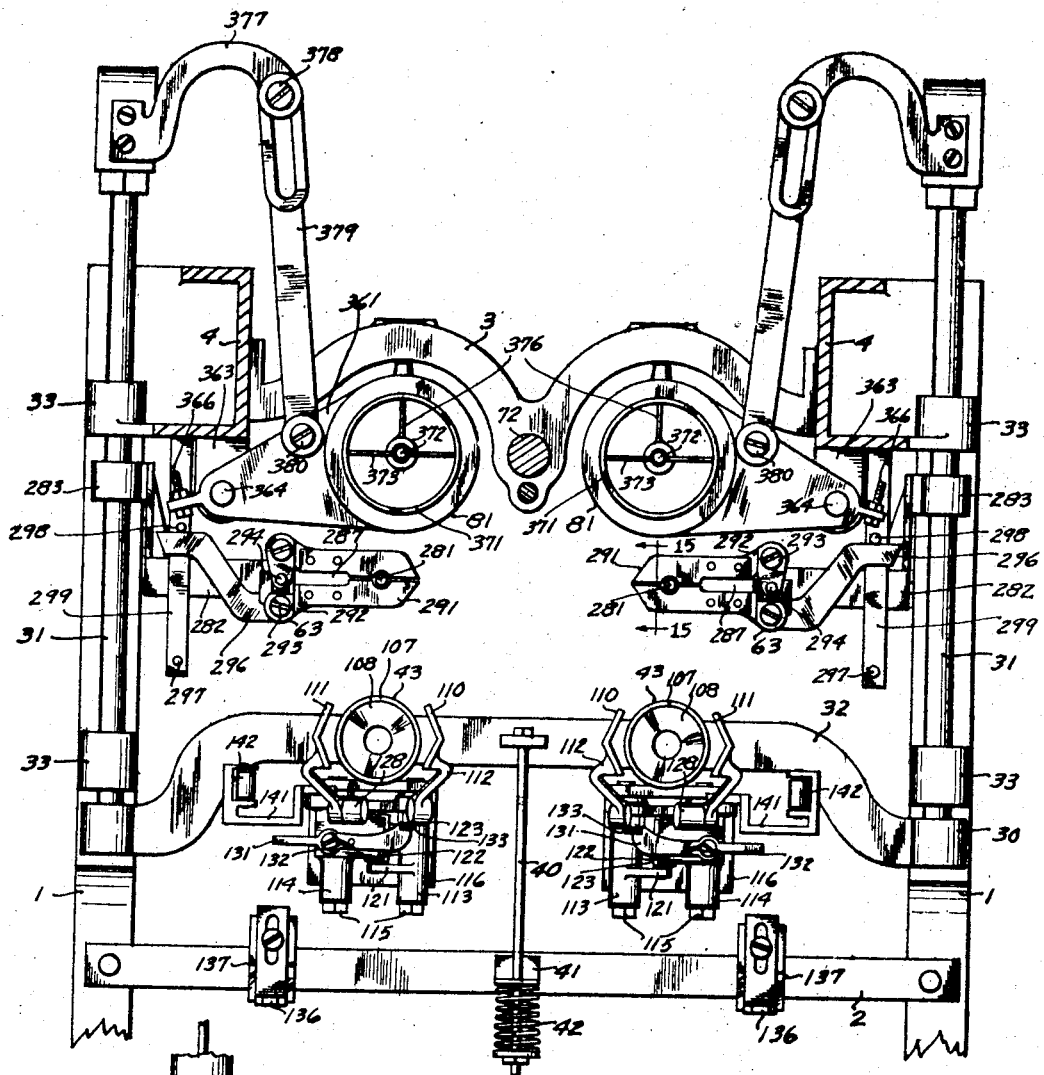
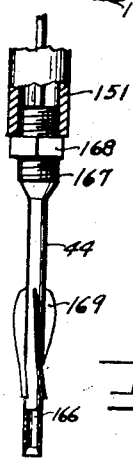
_Fig.13_
_Fig.14_
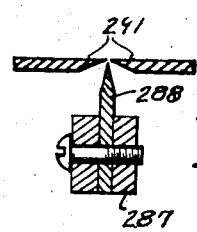
_Fig.15_
INVENTOR.
BURTON C. COONS
BY Philip A. Minnis
ATTORNEY Jan. 16, 1940. B. C. COONS 2,187,075
FRUIT PREPARATION MACHINE
Filed May 3, 1937 15 Sheets-Sheet 9
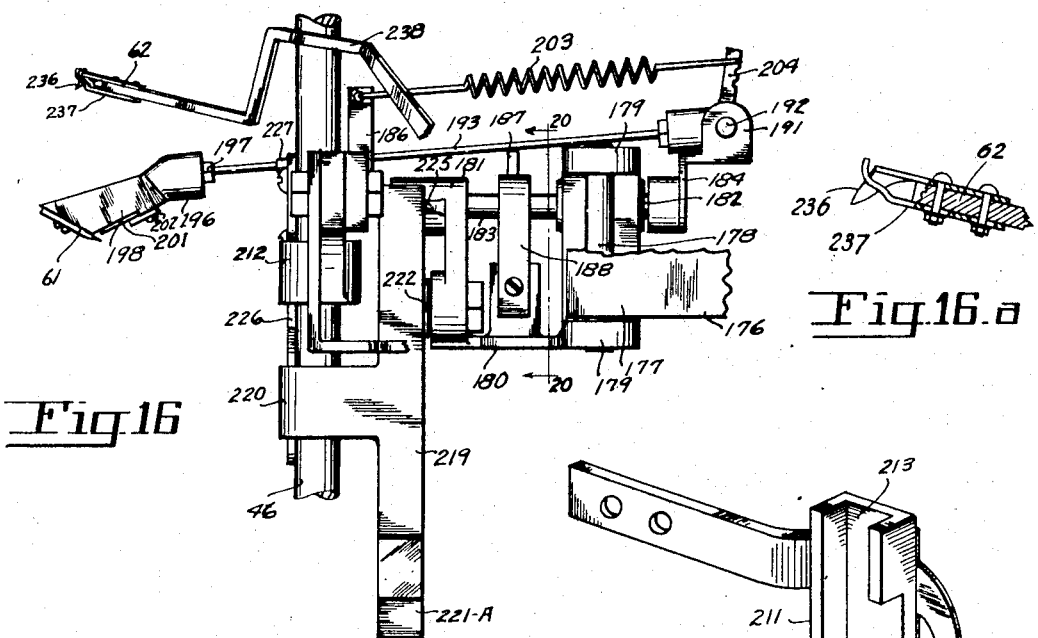
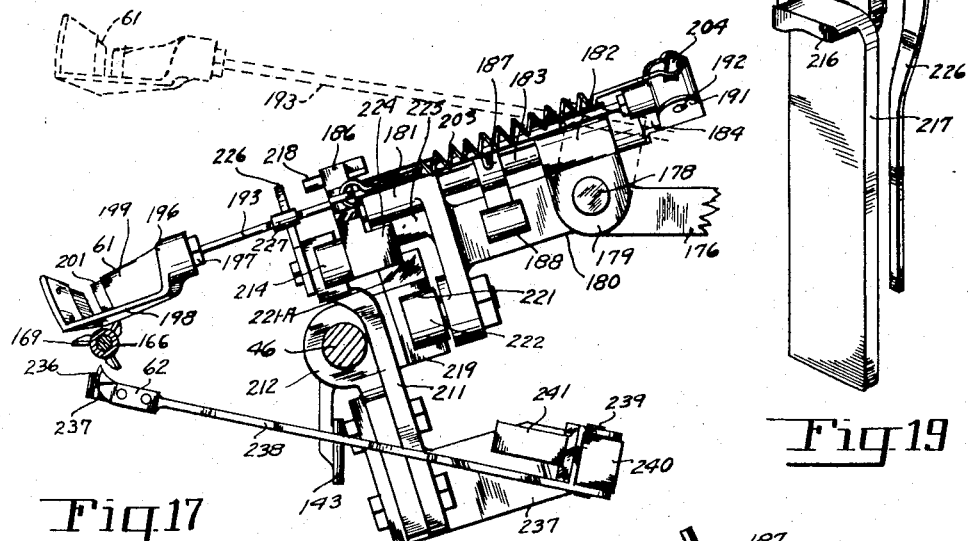
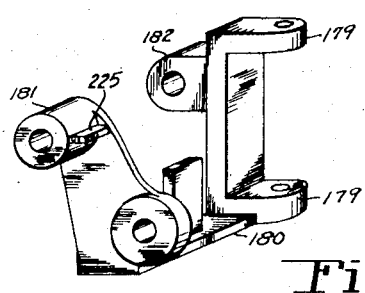
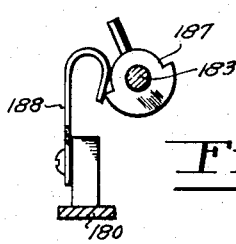
INVENTOR.
BURTON C. COONS
BY Philip G. Minnis
ATTORNEY

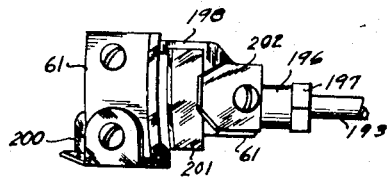
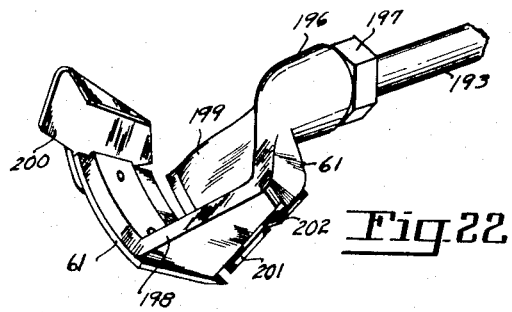
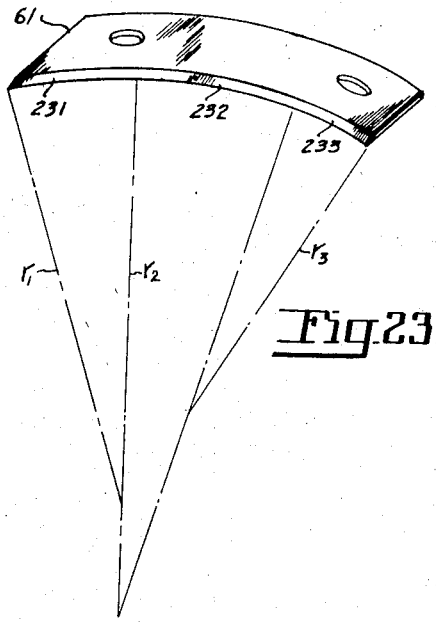
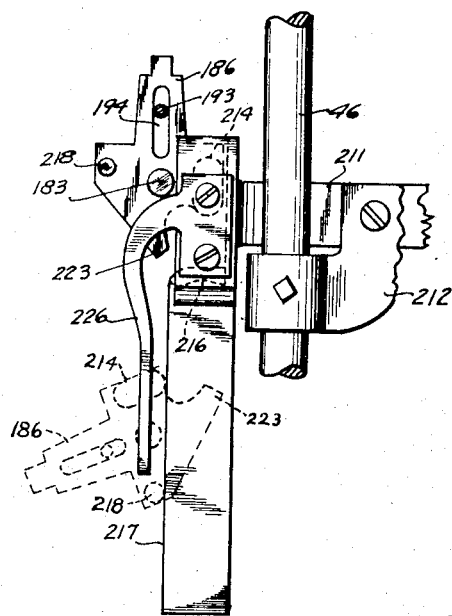
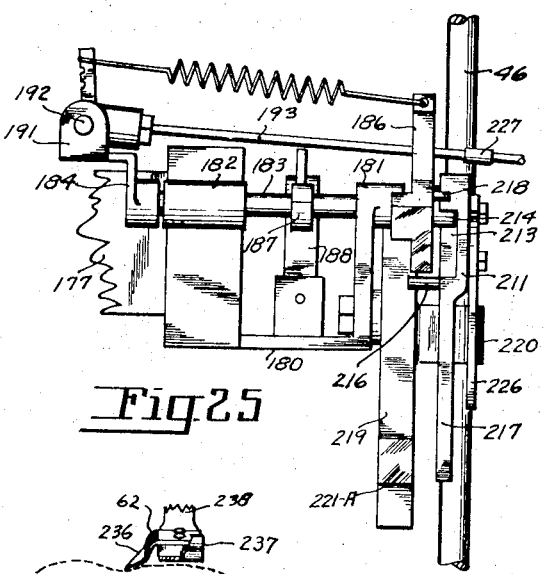
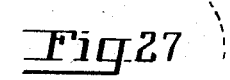
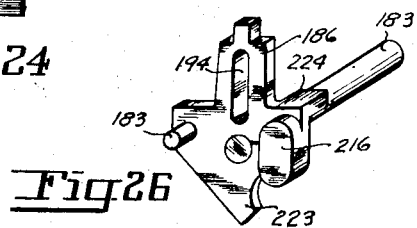

Jan. 16, 1940. B. C. COONS 2,187,075
FRUIT PREPARATION MACHINE
Filed May 3, 1937 15 Sheets-Sheet 11

INVENTOR.
BURTON C. COONS
BY Philip A. Minnis
ATTORNEY

INVENTOR.
BURTON C. COONS
BY Philip A. Minnis
ATTORNEY

INVENTOR.
BURTON C. COONS
BY Philip A. Minnis
ATTORNEY

Jan. 16, 1940.  B. C. COONS  2,187,075
FRUIT PREPARATION MACHINE
Filed May 3, 1937  15 Sheets-Sheet 14

INVENTOR
BURTON C. COONS
BY Philip G. Minnis
ATTORNEY

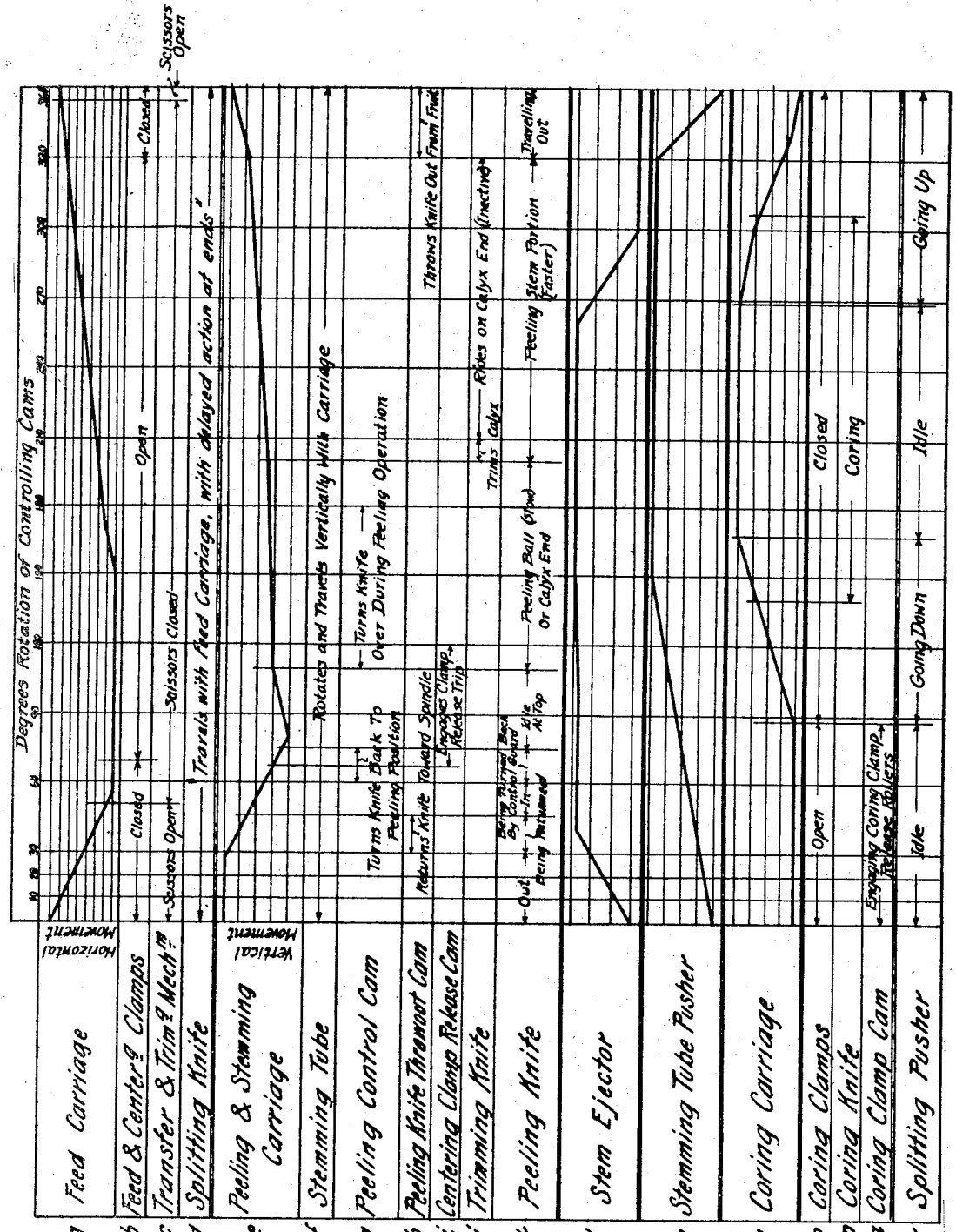

Patented Jan. 16, 1940

2,187,075

UNITED STATES PATENT OFFICE 2,187,075

FRUIT PREPARATION MACHINE

Burton C. Coons, Portland, Oreg., assignor to Food Machinery Corporation, San Jose, Calif., a corporation of Delaware Application May 3, 1937, Serial No. 140,325

22 Claims. (Cl. 146—33)

The present invention relates to fruit preparation machines, and more particularly to a machine of that character which is especially adapted for use in processing fruit, such as pears, to prepare the fruit for canning.

It is an object of the invention to provide an improved fruit preparation machine for stemming, peeling, trimming, coring and splitting fruit such as pears.

Another object of the invention is to provide an improved fruit preparation machine, which is adapted to process fruit such as pears in preparation for the canning operation, and to obtain a high yield in number of cases of canned pears per ton of fruit processed.

Another object of the invention is to provide improved centering and feeding means for a pear preparation machine.

Another object of the invention is to provide improved fruit supporting means to support the fruit during the peeling and trimming operations.

Another object of the invention is to provide improved peeling means for a pear preparation machine, which will peel various sizes and shapes of pears without gouging in passing over the curved portions of the fruit.

Another object of the invention is to provide a peeling knife of special contour to facilitate peeling of the fruit.

Another object of the invention is to provide improved means for preventing injury to the peeling knife and the stemming tube in the event fruit is not fed onto the stemming tube.

Another object of the invention is to provide improved cam control means for causing a peeling knife to follow the contour of a pear or similar fruit during the peeling operation.

Another object of the invention is to provide an improved means for trimming the calyx end of fruit.

Another object of the invention is to provide improved coring means for removing the seed cells of pears and similar fruit.

Other objects will appear as the description progresses with reference to the following drawings, illustrating a preferred embodiment of the invention especially designed for the preparation of pears.

Fig. 6 is a horizontal sectional view taken in planes indicated by the line 6—6 in Fig. 1.

Fig. 7 is a vertical sectional view of the coring knife taken in a plane indicated by the line 7—7 in Fig. 6.

Fig. 8 is an elevational view of the coring knife.

Fig. 9 is a horizontal sectional view of the coring knife taken in the plane of the line 9—9, Fig. 8.

Fig. 10 is a plan view of the feed carriage, showing it at one end of its reciprocatory travel, where fruit is fed to the various mechanisms carried thereby.

Fig. 11 is an enlarged front elevational view of the centering clamps similar to that shown in Fig. 1.

Fig. 12 is a vertical sectional view of the centering clamps taken in a plane indicated by the line 12—12 in Fig. 10.

Fig. 13 is a plan view of the feed carriage, similar to Fig. 10, but showing the feed carriage at the other end of its travel, where fruit is delivered therefrom to various processing mechanisms.

Fig. 14 is an enlarged view of the stemming tube, partly in section.

Fig. 15 is a detailed sectional view through the stem end trimming means, and is taken in a plane indicated by the line 15—15 in Fig. 13.

Fig. 16 is an enlarged elevational view of the peeling assembly, similar to that shown in Fig. 1.

Fig. 16a is an enlarged view of the calyx trimming knife, partly in section, illustrating the adjustable mounting of the fruit engaging guard thereof.

Fig. 17 is an enlarged plan view of the peeling assembly, similar to that shown in Fig. 6.

Fig. 18 is a perspective view of the knife supporting bracket.

Fig. 19 is a perspective view of the peeling knife control cam.

Fig. 20 is a detailed sectional view through the peeling assembly, taken in the plane of the line 20—20 in Fig. 16, with the parts shown in a different operative position.

Fig. 21 is a view of the fruit engaging side of the peeling knife.

Fig. 22 is an enlarged perspective view of the peeling knife.

Fig. 23 is an enlarged perspective view of the blade of the peeling knife.

Fig. 24 is an elevational view of the knife assembly taken as indicated by the line 24—24 in Fig. 6.

Fig. 25 is another elevational view of the knife assembly taken as indicated by the line 25—25 in Fig. 6.

Fig. 26 is a perspective view of the guide control means for the peeling knife.

Fig. 27 is a perspective end view of the calyx trimming knife, with the calyx end of a pear diagrammatically shown in position for the trimming operation.

Fig. 38 is a chart illustrating the timing of the operation and the respective movements of the various operative processing parts.

GENERAL DESCRIPTION

The fruit preparation machine of my invention is adapted to subject fruit such as pears successively to a series of operations, including stemming, peeling, trimming, coring and splitting, to produce pear halves ready for canning operations. As illustrated, the machine is constructed for two series of pears which are fed simultaneously and processed simultaneously by a similar series of mechanisms.

The machine will be described first in a general manner to enable a better understanding of various cross references which will be made in the description of the various mechanisms.

Figure 4:
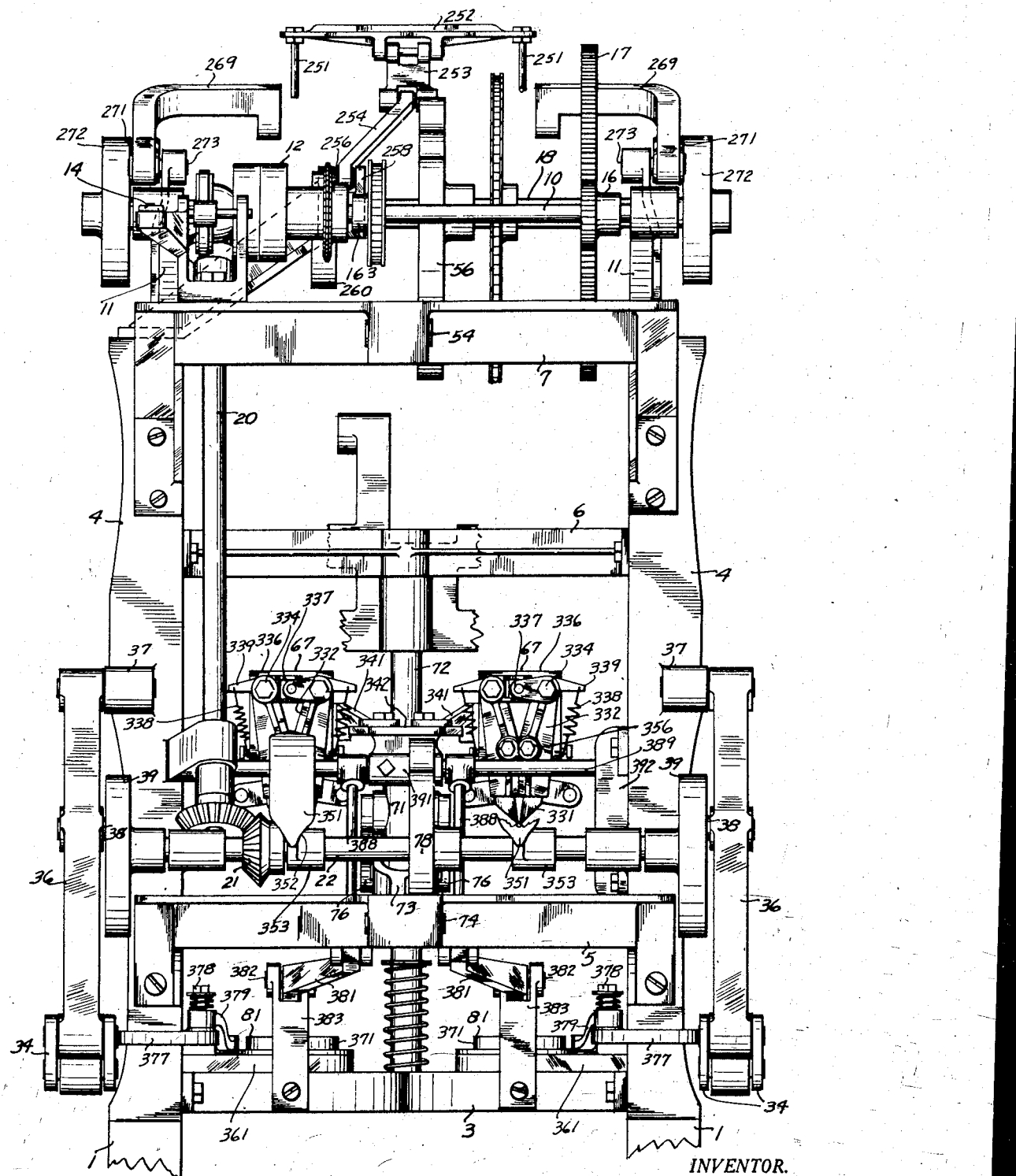
Fig. 4 is a rear elevation of the machine with certain parts broken away and others omitted for purposes of clarity.
Figure 5:
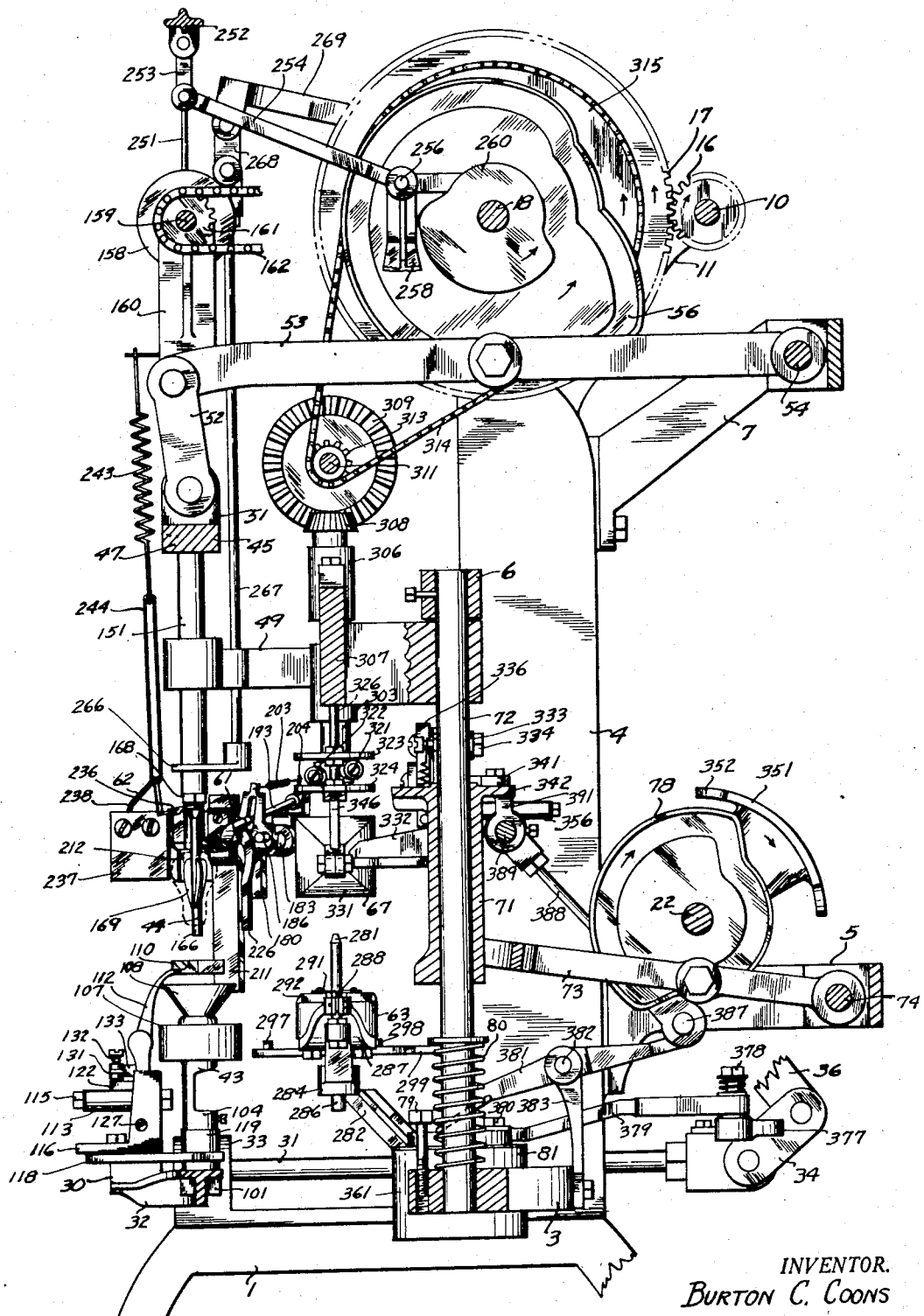
Fig. 5 is a longitudinal vertical section taken in the plane of the line 5—5 in Fig. 1.

The frame of the machine includes parallel base brackets 1 (Figs. 1, 2, 4 and 5) which are connected by front cross bar 2 and rear cross bar 3. On base brackets 1, similar upright standards 4 are suitably secured, with cross brackets 5, 6 and 7 (Fig. 4) extending therebetween to support various mechanisms as referred to hereinafter.

Figure 3:
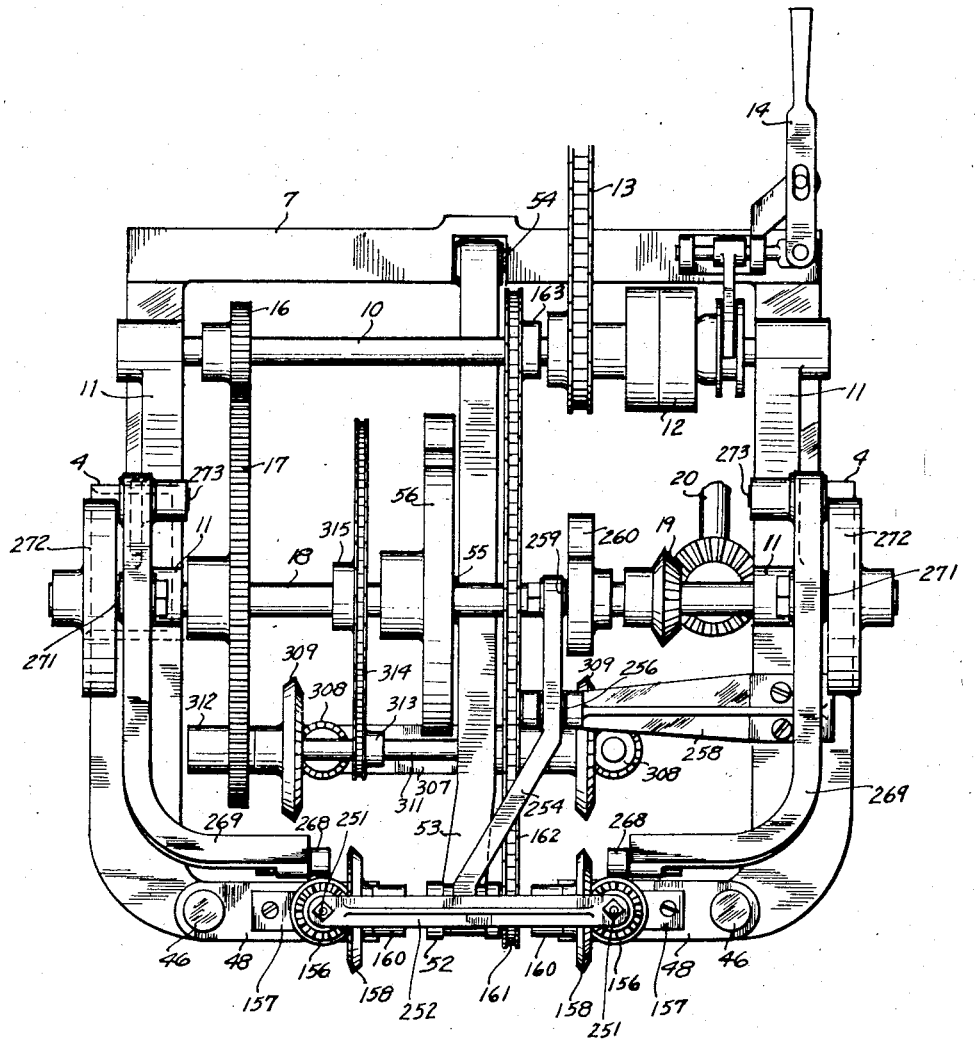
Fig. 3 is a plan of the top part of the machine, illustrating the drive mechanism.

The drive mechanism comprises a drive shaft 10 (Fig. 3) which is journalled in suitable bosses of journal brackets 11 suitably mounted on the standards 4. Shaft 10 may be driven through a suitable clutch 12 as by a chain 13 from any suitable source of power, such as an electric motor or the like, as controlled by clutch control lever 14. Drive shaft 10 carries a pinion 16, meshing with a large gear 17 on a camshaft 18, which is also suitably journalled in brackets 11. The camshaft 18 serves generally with the cam means associated therewith to impart and control the movement of certain vertically reciprocable parts, as well as to transmit a drive to other operative parts of the machine. For this latter purpose, the camshaft 18 has a bevel gear connection 19 with the upper end of a generally vertical drive shaft 20 (Figs. 3 and 4), which is journalled in suitable bearings on the frame. At its lower end, the shaft 20 has a bevel gear connection 21 (Fig. 4) with a camshaft 22 which is journalled in suitable bosses on the standards 4, and serves with its associated cam means to impart and control the movement of certain horizontally and vertically movable parts of the machine. It will be noted that the drive connection between respective camshafts 18 and 22 provides a 1 to 1 gear ratio therebetween so that during one cycle of operation of the machine, each control cam will rotate through 360°.

As stated above, the pears are fed successively through the machine, past various processing means, and such feeding is effected in a generally horizontal direction by means of a reciprocating feed carriage 30 which comprises side bars or shafts 31 (Figs. 1, 2 and 6) which are connected at their front ends by bracket 32. The bars 31 are slidably journalled in spaced bosses 33 of standards 4, and at their rear ends are pivotally connected to respective pairs of parallel links 34, each pair of which is also pivotally connected to a cam follower arm 36. Each cam follower arm 36 is pivotally mounted by a suitable pin in a boss 37 of the adjacent standard 4, and intermediate its ends is provided with a roller 38 engaging the track of a cam 39 secured on the adjacent end of the camshaft 22. Cams 39 are similar and operate as described later in timed relation to other operating parts to effect periodic reciprocations of the carriage in progressing pears through the machine, a dwell being provided at each of the end positions which are illustrated in Figs. 10 and 13. To aid in the cams 39 and facilitate movement of the carriage from the position shown in Fig. 13, rod 40 is secured to the bracket 32 of the carriage and extends through a bracket 41 on the frame bar 2, and a spring 42 is interposed between bracket 41 and a suitable washer on the rod 40 so as to urge the carriage from the position shown in Fig. 13.

The feed carriage provides a mounting for the pear centering and feeding means indicated generally at 43 to which pears are fed by an operator, and which centers and presents the pear to a pear supporting means 44 in the form of a stemming tube. The pear supporting means 44 is carried by a vertically reciprocating stemming and peeling carriage indicated generally at 45, and comprising a pair of parallel vertical shafts 46 (Figs. 1 and 2) and a transverse extending bar 47 connected therebetween. Each shaft 46 is slidably journalled in vertically spaced arms 48 and 49 of the adjacent standard 4, and the carriage is spring-urged from its lower position by respective compression springs 50 placed on the shafts 46 between arms 48 and suitable collars secured on the upper ends of shafts 46. To effect the vertical reciprocation of the carriage, bar 47 has an upstanding boss 51 which is connected by a link 52 to a cam follower arm 53 pivoted at 54 (Figs. 3 and 5) in the bracket 7. Intermediate its ends, the cam follower arm is provided with a roller 55 engaged with the track of a cam 56 on camshaft 18. The manner in which cam 56 controls the movement of the feed carriage is described in detail in connection with the description of the mechanisms carried thereby.

As described in detail hereinafter, the stemming tube reciprocates vertically to move downwardly and impale a pear presented thereto by the feeding and centering means, and to carry the pear upwardly for presentation to a peeling knife 61 and a calyx trimming knife 62, whose operation is controlled by the carriage, as described fully hereinafter.

Also mounted on the feed carriage is a stem end trimming and transfer means indicated generally at 63 (Figs. 1, 10 and 13) which receives a pear after the stemming and peeling operations, and presents the pear to the coring mechanism. During the movement of the feed carriage from the position shown in Fig. 10 to that shown in Fig. 13, the stem end trimming and transfer operates to cut off the stem end of the pear in a manner later described.

The coring mechanism comprises a rotatable coring knife 66 (Fig. 1), and clamp means 67 mounted for vertical movement relative to the coring knife as later described by means of a coring carriage or sleeve 71 (Figs. 1 and 5) which is slidable vertically on a post 72 extending between frame brackets 3 and 6. The vertical movement of the sleeve 71 and the clamp means supported thereby is effected by means of a cam follower arm 73 pivoted at 74 in frame bracket 5 and having its forked front end connected by links 76 with sleeve 71. Intermediate its ends, arm 73 carries a roller 77 engaged with the track of a cam 78 on camshaft 22. To control the extent of downward movement of the sleeve 71, a stud 79 is mounted in cross bar 3 to form a stop for engagement with the lower end of the sleeve, while the downward movement thereof is retarded by a spring 80 about the lower end of post 72. The details of construction and operation of the coring mechanism are described hereinafter.

After the coring operation, the pear is received from the coring clamp means by a slicing means indicated generally at 81, which is moved forward under control of the feed carriage for this purpose, as described hereinafter, and then back to a rearward position where the slicing operation occurs.

It will be understood that pears are fed successively through the machine, and that while one pear is being sliced, the next succeeding pear is being cored, the second succeeding pear is being peeled, and the third succeeding pear is being fed to the centering and feeding means. As duplicate mechanisms are controlled and operated simultaneously, such successive operations are performed simultaneously on two series of pears, as will be more apparent from the following detailed description of the various mechanisms.

FEED AND CENTERING MEANS

The feed and centering means 43 (Figs. 1 and 10–13) for each series of pears are similar, and each such means preferably comprises a rotatable cone shaped cup to receive and position the stem end of a pear and the pair of opposed and interconnected clamps for yieldably engaging and positioning the blossom or calyx end of a pear by engaging the exterior contour thereof. As previously described, the centering means are mounted on the horizontal feed carriage and the centering clamps are opened and closed at the two extremes of travel of the carriage as will appear hereinafter.

The cup and clamps of each feed and centering means are supported by the same means on the front bracket 32 of the feed carriage, which for this purpose, is recessed at 101 (Fig. 1) to provide a seat for an upright post 102, which has a flange seated on the bracket 32 and its lower end extending through seat 101 to receive a fastening nut 103. A holder bracket 104 is secured adjacent the upper end of the post 102 by a suitable set screw and is provided at its upper end with a seat for a bearing 106, upon which a cup holder 107 is rotatably mounted. The cup holder 107 is provided with a central aperture to receive the cylindrical lower end of a cone shaped cup 108, which is also centrally apertured. As previously explained, the cup 108 by virtue of its downwardly converging walls is adapted to receive and center the stem end of a pear, while the rotatable mounting thereof provides for rotation of the pear, as it is being impaled on the rotating stemming tube.

A pair of recessed horizontal clamps 110 and 111 are provided in offset relation at the upper end of arms 112 which extend upwardly from parallel bosses 113 and 114 pivotally mounted on respective studs 115 secured in an L-shaped mounting bracket 116. The bracket 116 is adjustably mounted to provide for accurate centering of the clamps with respect to the cup 108. As seen in Figs. 11 and 12, the bottom of bracket 116 is provided with slots 117 to receive suitable fastening bolts which also pass through slots 117a formed at right angles to slots 117 in a supporting bracket 118. Bracket 118 has a boss 119 suitably engaged about and secured to the post 102 by a set screw.

The clamps 110 and 111 are interconnected for simultaneous movement toward and from clamping position by respective horizontally and vertically spaced extensions 121 and 122 thereof, and a pivot block 123 which slides between extensions 122 and is pivoted to extensions 121. The clamps 110 and 111 are yieldably urged to a clamping position by a spring 124 compressed between a depending ear 126 of boss 114, and a wall bracket 116, which are apertured to receive a spring supporting stud 127. The inward movement of clamps 110 and 111 (when no pear is fed) is limited by a rubber stop or bumper 128, which is mounted on one clamp arm 112 and is adapted to engage a face of the other clamp arm 112. From the above description, it will be noted that clamps 110 and 111 are mounted and connected to engage the calyx end of a pear and center the same from the exterior contour thereof.

Latch means is provided for maintaining the open position of the clamps when desired, and such means may comprise a latch lever 131, which is pivotally mounted intermediate its ends on the boss 114 and is normally urged to clamping position by a spring 132. At one end of latching lever 131, a notch is provided for engagement with a lug 133 projecting from the arm 112 of clamp 110, while its other end extends outwardly to engage latch release means in the form of a trip 136, which is mounted for adjustment toward and from the latch lever by a suitable bolt and slot connection with an upstanding bracket 137 on bar 2 of the frame. Trip 136 is so positioned with respect to the latch lever 131 that when the feed carriage reaches its extreme forward travel as shown in Fig. 10, the latch lever 131 is disengaged and held in such position as illustrated.

The above described release of the clamps 110 and 111 permits them to engage about and center a pear which is positioned in the cup 108, so that during subsequent return movement of the feed carriage, the pear will be moved into alignment with the stemming tube 44 with its calyx end uppermost, the pear being held in the centered position determined by the cup 108 and the clamps 110 and 111.

While the feed carriage is stationary in its rearward position, the peeling and stemming carriage moves downwardly so that the stemming tube 44 engages and penetrates the pear.

At this time the clamps 110 and 111 are opened by means mounted on the stemming and peeling carriage. For this purpose, the clamp 111 is provided with an offset arm 141 carrying a roller 142 for engagement with a vertically disposed cam 143 (Fig. 1) which has its collar 144 adjustably secured on the adjacent carriage shaft 46, and is in vertical alignment with the roller 142 in the position of the carriage shown in Fig. 13. The timing of this operation is such that the cam 143 during its downward travel will engage the roller 142 shortly after the stemming tube 44 has commenced its penetration of the pear. In this manner the alignment or centering of the pear by the clamps 110 and 111 is maintained so that the pear is impaled on the tube 44 in this same centered relation. However, the clamps 110 and 111 are moved to open position immediately after the stemming tube has penetrated the pear a sufficient amount to hold the same in its centered position during the remainder of the impaling operation.

STEMMING AND PEELING MECHANISM

*Stemming tube*

Figure 1:
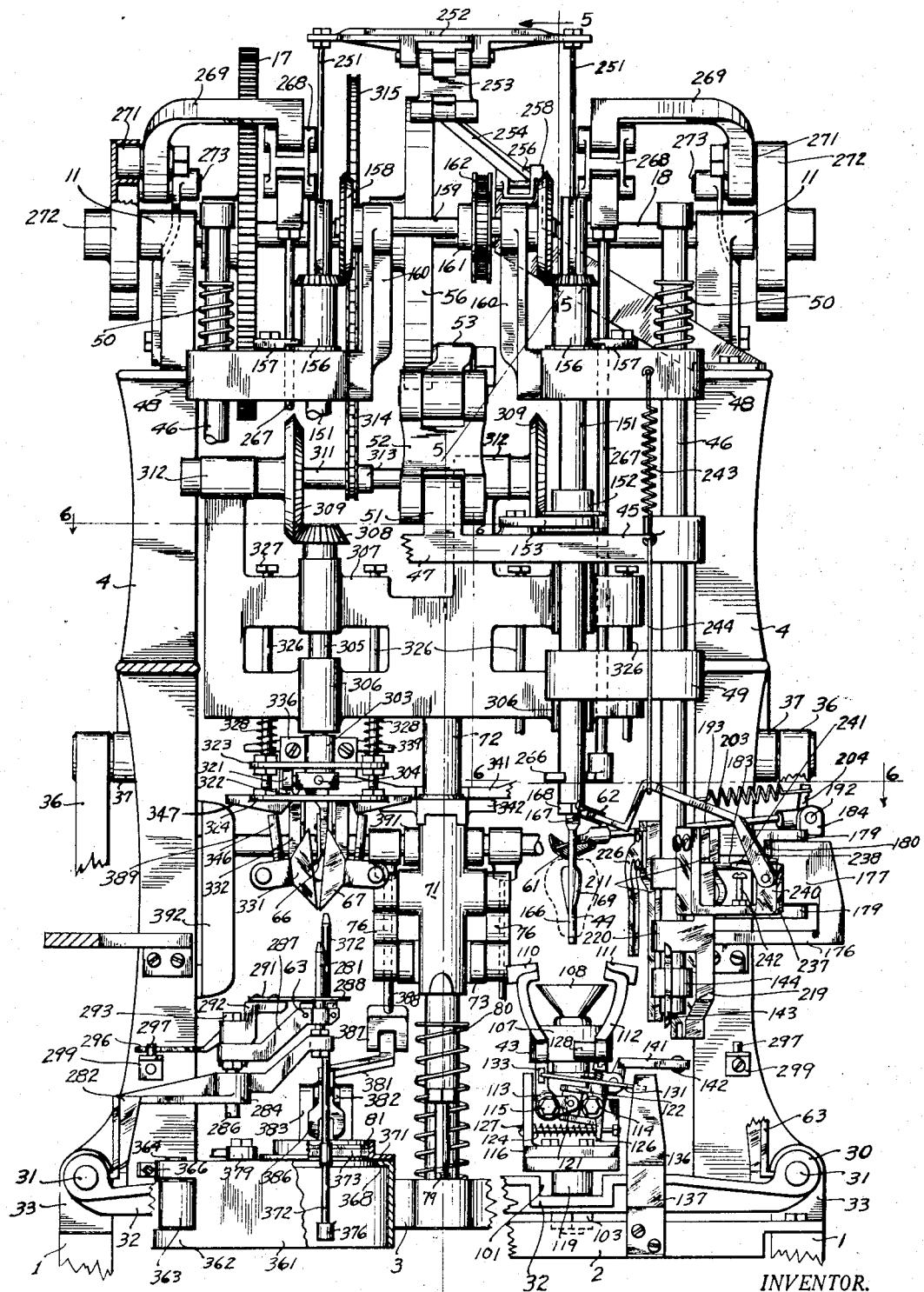
Fig. 1 is a front elevation of the machine with certain parts broken away and omitted for purposes of clarity.

As previously explained, the stemming tube is mounted for vertical reciprocation with the stemming and peeling carriage, and at the same time, the tube is provided with a drive connection whereby it is rotated constantly during operation of the machine. Referring to Fig. 1, it will be noted that each stemming tube assembly includes a hollow shaft 151, which is mounted for vertical sliding movement in the adjacent projecting arms 48 and 49 of the standard 4, and is provided with a grooved collar 152, which is engaged by a fork 153, secured on the cross bar 47 of the stemming and peeling carriage. The inter-engagement of the collar 152 and the fork 153 provides for vertical movement of the stemming tube with the carriage while allowing relative rotation of the tube with respect to the carriage.

The drive connection for shaft 151 of the stemming tube comprises a collar 156 (Fig. 1) which has a splined connection with shaft 151 and is held in place on arm 48 by a clamp 157. At its upper end collar 156 is provided with an integral bevel pinion meshing with a bevel gear 158 on a transverse drive shaft 159, journalled in upstanding bosses 160 of the arms 49. As seen most clearly in Figs. 3 and 5, shaft 159 is provided with a small sprocket 161 which is driven through chain 162 from a larger sprocket 163 on the drive shaft 10, so that a relatively rapid rate of rotation is provided for shaft 151 of the stemming tube assembly.

The stemming tube proper comprises tube 166 (Figs. 1 and 14) having its lower end sharpened to facilitate penetration of the fruit, and having an enlarged upper threaded portion 167 which threads within the hollow shaft 151 and is locked in position relative thereto by a nut 168. Intermediate its ends, the tube 166 is provided with a plurality of spirally mounted, radially extending fins 169, which are somewhat elongated and taper from their lower ends upwardly to provide increased radial depth of their upper ends.

The stemming tube assembly rotates in a direction corresponding to the lead of the spirally mounted fins 169, so that in penetrating the pear, such fins tend to act as screw threads and draw the pear up onto the tube 166, and hold it from pushing off while the peeling operation is effected. The angle of the fins is so selected that the pear is always lifting up or pulling toward the knife, as will be more apparent later in connection with the description of the peeling operation.

At the same time the increasing radial depth of the fins 169 provides a wedging action as the fins enter a pear to insure firm gripping of the pear, such action being especially desirable if the fruit being processed is soft. It will be noted that during the downward pear impaling movement of the tube 166, the tube will cut out a cylindrical segment containing the stem portion of the pear and a part of the core and the calyx.

*Peeling knife mechanism*

Figure 2:
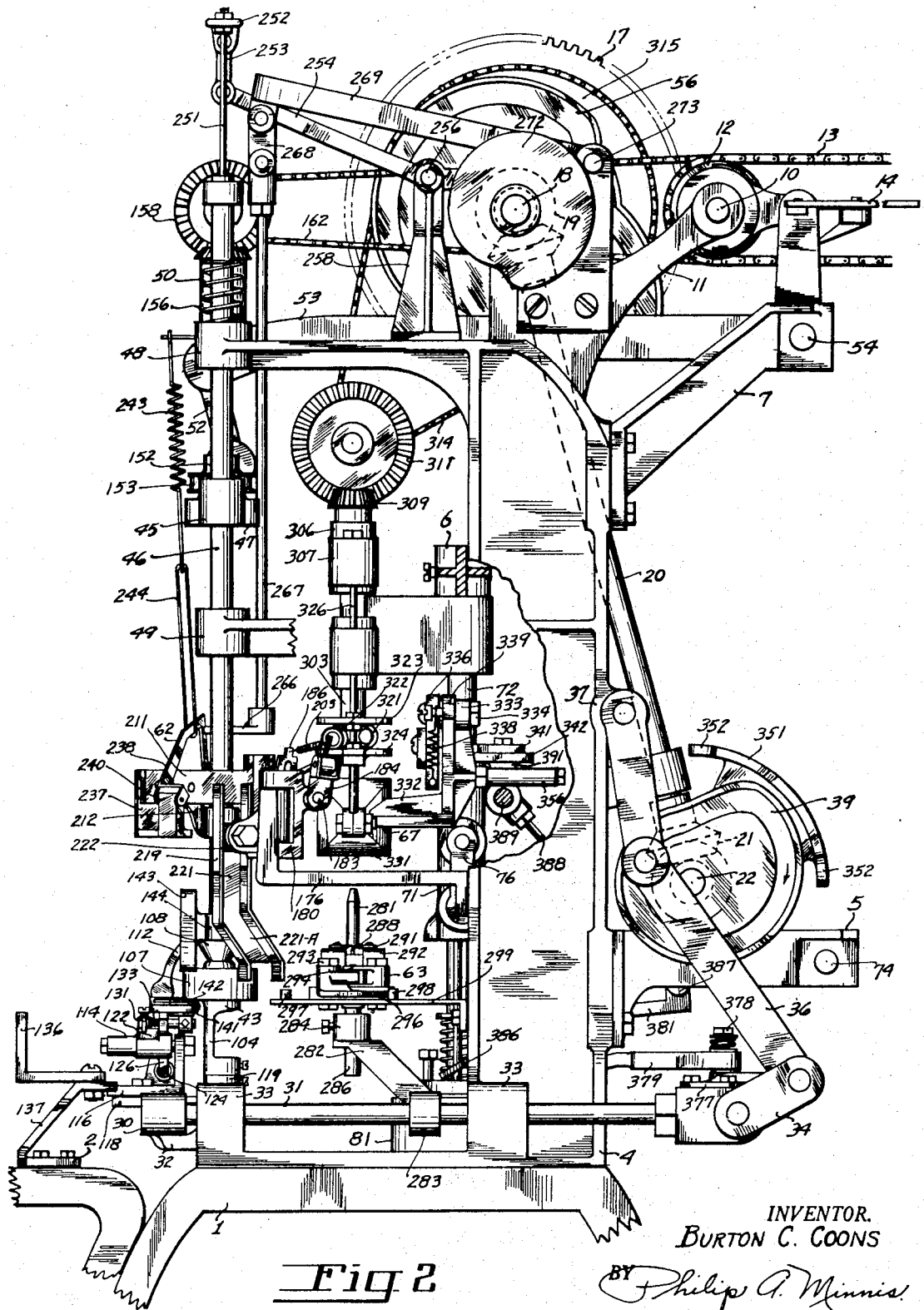
Fig. 2 is a side elevation of the machine.

The peeling knife proper is of special construction, as described hereinafter, to permit its operative peeling engagement over the entire surface of the pear during upward travel of the stemming tube without gouging by the blade edges, and, to facilitate its peeling operation, the knife is mounted for universal movement as controlled by cam means carried by the stemming and peeling carriage. Referring to Figs. 1 and 2, a bracket 176 is secured to the front face of standard 4 and extends forwardly and then upwardly to provide a vertical boss 177 which pivotally receives a pin 178 (Figs. 16-18 and 25) suitably secured in opposed ears 179 of a knife assembly supporting bracket 180. Thus, the knife assembly supporting bracket 180 and the peeling knife carried thereon are mounted for pivotal swinging movement about the vertical axis of the pin 178, and such swinging movement is controlled in a manner later described.

The bracket 180 is provided with spaced horizontal bosses 181, 182 to receive a knife supporting shaft 183, which provides a horizontal pivotal axis of support for the knife. Knife supporting shaft 183 is held against endwise movement by a knife arm bracket 184 secured on the shaft 183 adjacent the boss 182 and a knife control guide 186 secured on the shaft 183 adjacent boss 181, as seen most clearly in Fig. 25. As seen in Figs. 20 and 25, the knife shaft 183 is provided intermediate its ends with a cam 187 having two arcuate surfaces of differing radii, and which is engaged by a flat U-shaped spring 188 secured on the bracket 180. As explained later, the position shown in Fig. 20 corresponds to the initial peeling position of the knife blade with respect to the calyx end of the pear. The simultaneous engagement of the spring 188 with the two surfaces of cam 187 provides a definite angular position of knife shaft 183, and accordingly of the knife blade at the beginning of the peeling operation. This insures peeling of the base of the pear immediately around the calyx even after wear in the knife controlling parts.

The knife arm bracket 184 is provided with opposed upstanding ears 191 to receive a pivot pin 192 (Figs. 16, 17 and 25) secured in one end of knife arm 193. Knife arm 193 extends through a vertical slot 194 (Figs. 24 and 25) in the knife arm guide 186, and its forward end has a knife bracket 196 threaded thereon and locked in position by a nut 197. The knife bracket 196 is provided with an L-shaped forward extension 198 whose offset end is spaced from and forms an angle with a flat guide supporting portion 199 of the bracket. The offset end of L-shaped portion 198 provides a mounting for the knife 61 and a substantially V-shaped peeling guide 200, which are secured thereon by suitable fastening screws. On the bottom face of portion 199, pear engaging guide plate 201 is adjustably secured by a clamp 202, with the beveled edge of the plate 201 in spaced relation from the beveled cutting edge of knife 61. The spacing of the plate 201 from the knife 61 gauges the thickness of the peeling removed by the knife, the peeling being carried away through the peeling guide 200. Slot 194 in the guide 186 allows movement of the knife with arm 193 about its axis 192 against the influence of a spring 203 (Figs. 16 and 17), which is tensioned between the top of the guide 186 and a projection 204 on the knife arm. Thus the knife 199 can move inwardly and outwardly with reference to a pear being pelled, to accommodate any irregularity in the contour thereof, or to cooperate with various sizes of pears, and is spring urged against the pear with the guide plate 201 in engagement therewith.

As previously explained, the peeling operation starts at the calyx end of the pear and proceeds as the pear is drawn upwardly past the knife, and means is provided for turning the knife about the axis of the knife supporting shaft 183 so that it will travel around the bulge of the pear in timed relation to the upward movement of the pear. Such control means is preferably provided in the form of a cam and guide control bracket which is mounted for vertical movement with the stemming and peeling carriage. For this purpose, a cam control bracket 211 (Figs. 16, 17, 19 and 24) is mounted by a support 212 on vertical shaft 46 of the carriage. The bracket 211 (Fig. 19) is provided with a guide slot 213 at the upper end thereof for cooperation with an elongated projection 214 (Fig. 26) of generally oval cross section on the guide 186. Spaced below the guide slot 213, the bracket 211 (Fig. 19) is provided with a transverse cam projection 216 at the top of a guiding edge 217, both of which cooperate with the projection 214 of the guide 186.

Figure 28:
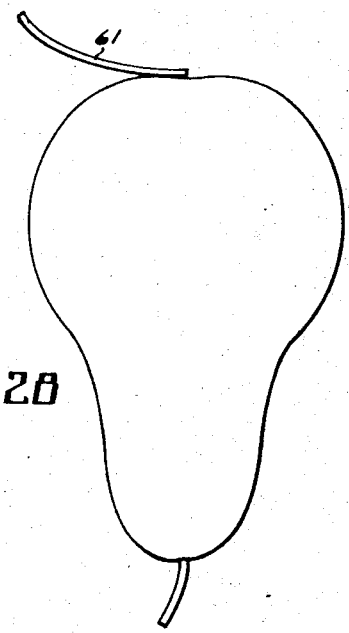
Figs. 28 to 31 are diagrammatic views illustrating the peeling knife in various positions on a pear during the peeling operation.
Figure 29:
Figure 30:
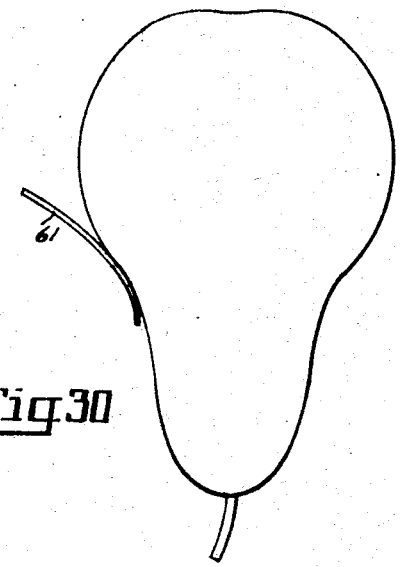
Figure 31:
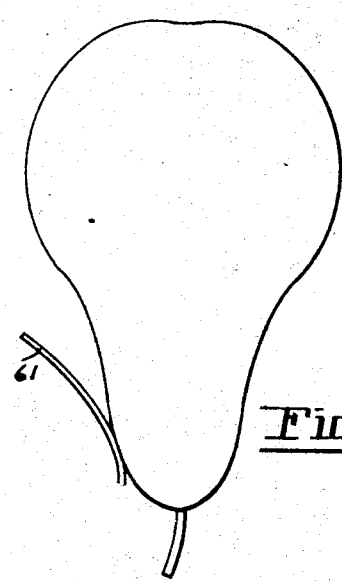
Figure 32:
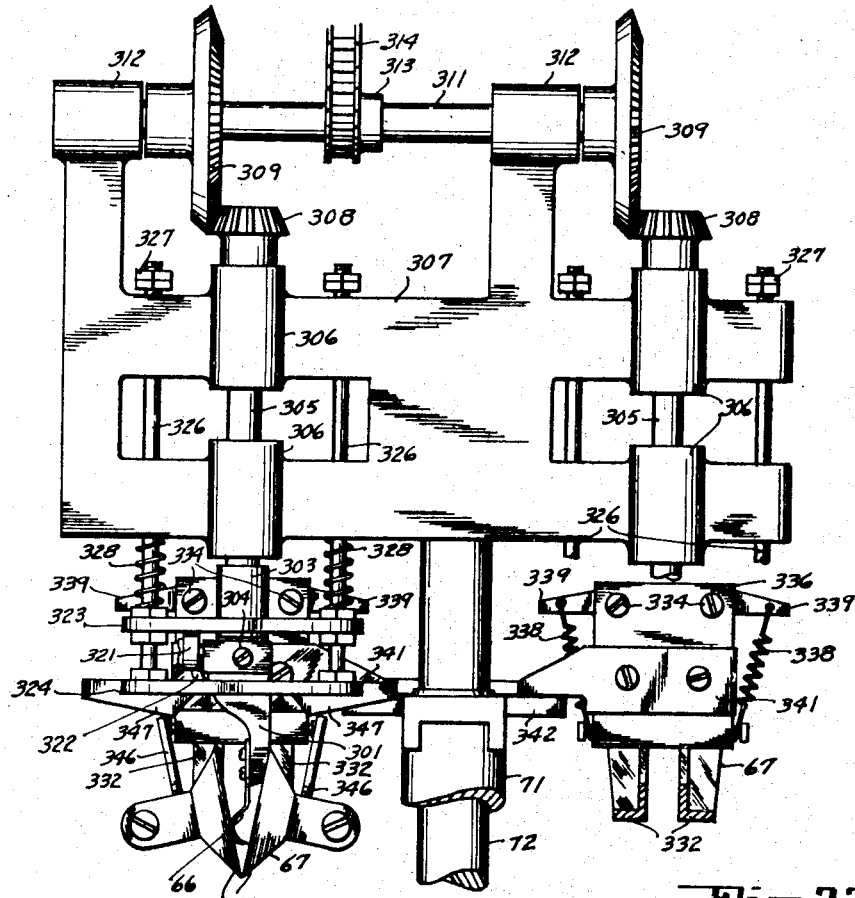
Fig. 32 is an enlarged sectional elevation of the coring mechanism.

In the lowest position of the stemming and feeding carriage, projection 214 is engaged with guide slot 213 as shown in Fig. 17, and spring 188 is engaged with cam 187 as shown in Fig. 20, to maintain the knife assembly as shown in full lines in Figs. 16 and 24. In this position the knife is adapted to engage the pear as illustrated in Fig. 28. As the pear on the stemming tube, and the control bracket 211 start moving upwardly, cam extension 216 of bracket 211 engages projection 214 of the guide 186, and rocks the guide and the knife about the shaft 183 until pin 218 on the guide 186 engages edge 217 of the bracket 211 as shown in dotted lines in Fig. 24. For purposes of convenient illustration, the dotted line position of guide 186 in Fig. 24 is shown as though the guide had moved vertically rather than control cam 211 and shaft 46 as actually occurs. The timing of the rotation of the knife about the axis of shaft 183 is such that the pear moves relative to the knife from the position shown in Fig. 28, through that shown in Fig. 29, to that shown in Fig. 30, the rate of movement of the stemming tube and the pear is relatively slow during this time as the knife is peeling over the longest peripheral part of the pear. When the knife is positioned as in Fig. 30, projection 214 and pin 218 are engaged with the edge 217 of the control cam 211 and remain in engagement therewith until the peeling operation is completed, that is, while the knife and pear have relative movement from the position of Fig. 30 to that of Fig. 31.

At the end of the peeling operation, means is brought into play to swing the knife away from the pear and permit removal of the pear from the stemming tube. For this purpose a cam slide 219 (Figs. 1, 2, 16 and 17) is mounted by means of a hub 220 on the adjacent shaft 46, and is provided, as seen most clearly in Fig. 2, with a cam track 221 which is vertical through most of its extent, but at its lower end inclines to one side at 221A. The track 221 is engaged by a roller 222 (Fig. 17) on the supporting bracket 180 to control swinging movement of the bracket about the axis of the pin 178. Roller 222 and track portion 221A operate to swing the knife supporting bracket and the knife arm 193 laterally to the dotted line position shown in Fig. 17, so that the knife assembly will be out of the way of the pear to permit its removal from the stemming tube, as later described. While the guide 186 is out of engagement with its position controlling means on the bracket 211, the position of the knife about the axis of the knife shaft 183 is maintained by the engagement of spring 188 with its associated cam 187. As the stemming and peeling carriage starts its upward travel, portion 221A of cam slot 221 becomes effective to return the knife assembly into relation with the control means therefor.

During the subsequent upward travel of control bracket 211, cam extension 216 thereof engages a tail 223 of guide 186, and rocks the guide back to the position shown in Figs. 17 and 24, where an extending lug 224 (Figs. 17 and 26) of guide 186 is engaged with a stop projection 225 (Figs. 17 and 18) of the supporting bracket 180, the assembly being resiliently maintained in this position by the engagement of spring 188 with cam 187 as seen in Fig. 20.

Means are provided for preventing the peeling knife from striking the stemming tube, in the event no pear is fed during the operation, so as to avoid injury to the parts. Such means comprises a cam 226 (Figs. 19 and 24) which is secured to the cam bracket 211 in alignment with a roller 227 on the knife arm 193. It will be noted that the cam 226 conforms generally to the outline of a pear, the projecting portion thereof being such as to carry the knife clear of the fins 169 on the stemming tube 166, the relation of the parts being seen most clearly in Fig. 1. Preferably, the lower part of the cam 226 determines the outline of the stem end of the pear. This is effected by allowing "re-peeling" or repeated operation of the peeling knife on the stem portion of the pear until the roller 227 engages the cam 226 and prevents further peeling. If desired, the cam 226 can be similarly used throughout its length to provide a "formed" pear of a desired contour.

The peeling knife 199 has a cutting edge of special contour to enable successful peeling of various types of pears, particularly those which have a more or less sharply curved portion extending from the bulb to the neck, as for example, with the contour shown in Figs. 28 to 31. The peeling knife as illustrated in Fig. 23 is provided with arcuate sections 231, 232 and 233, which have different curvatures as provided by the respective radii, $r_1$, $r_2$, and $r_3$. Section 231 is at the leading edge of the blade, and section 233 is at the trailing edge where the first peeling occurs as illustrated in Fig. 28. It will be noted in Fig. 28 that the arc of edge 233 is such that it contacts the top of the pear, but that the side edge can not gouge. Then as the blade is rocked around as in Fig. 29, the peeling is done entirely by the central portion 232 which has the least curvature and might be considered as being substantially straight. This configuration is desirable as it avoids to a great extent grooving or leaving marks on the pears around the bulging calyx ends thereof. Then, as the blade moves into the sharply curved portion below the bulb of the pear, the remainder of the peeling is done by the leading edge 231 which has a curvature less sharp than the portion 233, but of greater curvature than the portion 232. This curvature prevents gouging of the leading side edge of the blade as it passes into the pear portion of deepest curvature, and also keeps the trailing edge of the blade well away from the pear to prevent any gouging by such edge.

I have found that this relation is somewhat critical in order to enable handling of various sizes of pears and to perform a good peeling operation without any circular grooves in the pear, which would result from gouging if such took place. For example, I have found good results can be obtained for a blade having a total length of substantially 1 7/8 inches with the following radii for the curvature and the following length for the section of the blade (see Fig. 23):

|  | Radius | Length |
|---|---|---|
|  | Inches | Inches |
| Leading section (231) | 2¼ | ½ |
| Middle section (232) | 3 1/16 | 9/16 |
| Trailing section (233) | 1¾ | ¾ |

Trimming Knife

Means are provided for trimming about the calyx of a pear, that is, for peeling the depressed portion immediately surrounding the calyx where the peeling knife cannot reach, and for cutting out any part of the calyx not removed by the stemming tube. Such means is in the form of a knife 62, having a triangular cutting point 236 (Figs. 16, 17 and 27) which extends downwardly and laterally from the straight part of the knife which is suitably secured on a knife arm 238. Associated with the knife 62 is a pear engaging guide in the form of a plate 237 (Figs. 16 and 16a) adjustably secured by means of a suitable bolt and slot connection at the end of knife arm 238 for longitudinal adjustment relative thereto. The projecting end of guide plate 237 is bent upwardly in front of the knife 62, and by its adjusted position on the knife arm serves to determine the depth of cut of the knife. The knife arm 238 (Figs. 2 and 17) is pivotally mounted by pin 239 in a bracket 240, which is suitably secured on control bracket 211. Knife arm 238 is provided with an extension 241, which is engageable with an adjustable stop 242 (Fig. 1) on bracket 240, whereby the lowermost position of the trimming knife can be adjusted.

Means are provided for holding the knife 238 out of engagement with the pear until near the end of the peeling operation, or at least until the peeling knife is working on the stem end, to prevent any possibility of weakening the holding power of the fins when the peeling knife is tending to push the pear downwardly, and of pushing the pear off the stemming tube. Such means comprises a spring 243 (Fig. 2) extending between link 244 engaged with the knife arm 238 and arm 48 of the frame. The spring 243 serves to hold the trimming knife out of engagement with the fruit until the fruit is approximately half peeled to avoid the possibility of weakening and pushing the pear off the tube. The guard 237 on the bottom of the knife arm 238 and placed directly underneath the trimming knife prevents any digging in, and after the pear has made one or two revolutions, the trimming knife will cut no more because of this guard.

Stem Ejector

As previously described, the stemming tube 166 serves to cut out a cylindrical segment containing a portion of the calyx, core and the stem of the pear, and means are provided for ejecting the cut material just prior to the time the pear is pushed off the stemming tube. The ejector for each stemming tube 166 is in the form of a rod 251 (Figs. 1, 2 and 14) which extends downwardly through the hollow shaft 151 and is guided at its lower end in the stemming tube 166. At their upper end, the ejector rods 251 (Figs. 1 and 2) are secured at the respective ends of a bar 252 (Figs. 1 and 2), which is operated through a link 253 from a cam follower arm 254 (Figs. 1, 5, 34 and 35), which is pivoted at 255 in bracket 256 and has a roller 259 engaged with the track of a cam 260 on cam shaft 18. Referring to the phantom view shown in Fig. 34, it will be noted that near the end of the peeling operation the ejector rod 251 has just begun to project through the stemming tube 166, so that the pear stem and a portion of the meat cut by the stemming tube has been ejected therefrom.

Stemming Tube Pusher Means

Figure 34:
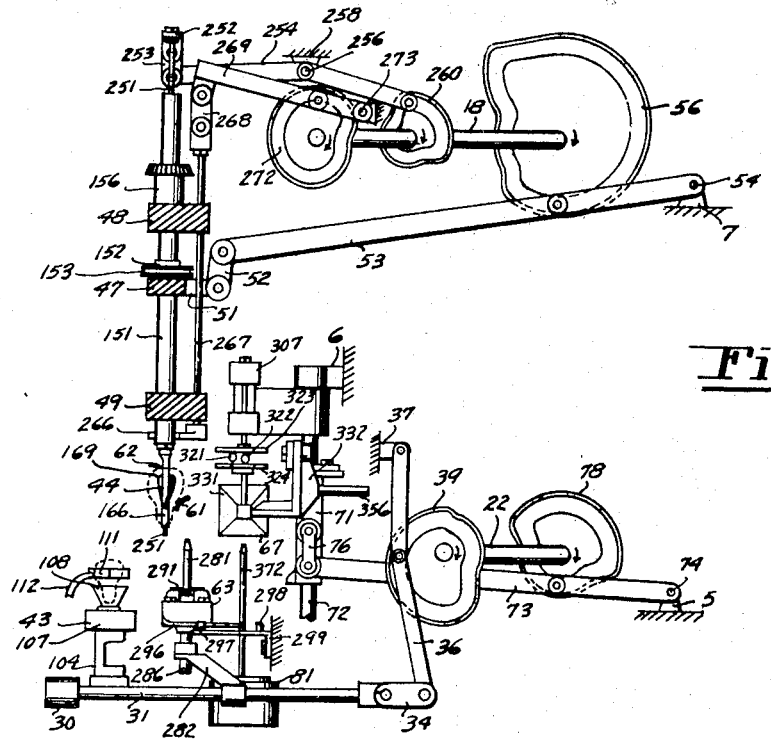
Figs. 34 and 35 are schematic phantom views of certain of the operative parts of the machine at different times during the cycle of operations in processing a pear.
Figure 35:
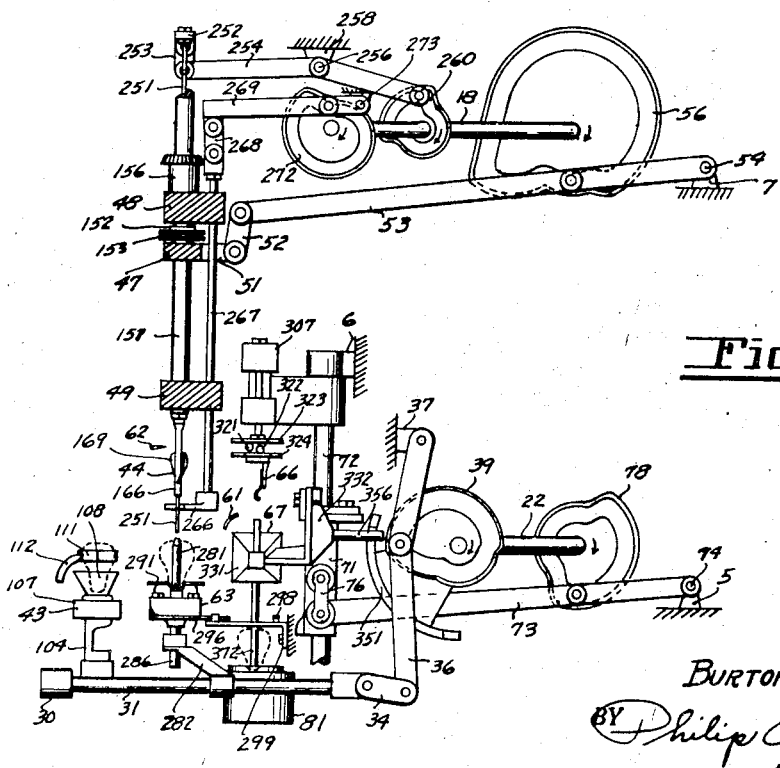

Means are provided at the end of the peeling operation for pushing the pear off the stemming tube onto the stem end trimming and transfer device, which is described hereinafter. Such means may take the form of a split pusher foot 266 (Figs. 1, 2, 34 and 35) which embraces the stemming tube and is mounted at the lower end of a vertical rod 267, which is guided in arms 48 and 49 of the frame. At its upper end the rod 267 is connected by a link 268 with a cam follower arm 269 having a roller 271 engaged with a track of a cam 272 on the camshaft 18. Arm 269 is pivoted at 273 and operates as shown in Figs. 34 and 35 to push off the pear at the end of the peeling operation onto the stem end trimming and transfer mechanism. It will be noted that at the time the pusher foot descends, the peeling knife has been swung around out of the way, while the trimming knife does not interfere because it is aligned with the opening of the pusher foot as seen most clearly in Fig. 1.

Stem End Trimming and Transfer Mechanism

As previously described, at the end of the peeling operation, the pear is pushed off the stemming tube onto a device for trimming or cutting off the stem end and for transferring and presenting the pear to the coring mechanism, such mechanism operating in timed relation with the peeling and the coring mechanism. For this purpose a positioning and transferring rod or spindle 281 (Figs. 1, 2, 10 and 13) is mounted at the inner end of a bracket 282, which has its outer offset portion formed with a boss 283 secured on the adjacent feed carriage shaft 31. Thus, the rod 281 is mounted to move with the feed carriage and is so positioned as to move back and forth from beneath the stemming tube to beneath the coring mechanism, and vice versa. Intermediate its ends, bracket 282 is provided with a boss 284 to receive a vertical post 286 carrying an arm 287, which is bifurcated at its upper end to embrace the rod 281 and to mount vertically disposed aligned knives 288, (Figs. 1, 10, 13 and 15) at either side of the rod 281 so that a pear, when received by the rod 281, will have its stem end partially split by the knives 288.

For cutting off the stem end of the pear immediately at the top of the cut made by the knives 288, a pair of scissors 291 are provided (Figs. 10, 13 and 15), secured on similar bell cranks 292, pivoted at 293 on arm 287 and having their adjacent arms pivotally and slidably connected at 294 to provide for simultaneous movement of the scissors. The cooperating cutting edges of the scissors are recessed to embrace the rod 281 in their closed position as illustrated in Fig. 13. One of bell cranks 292 is provided with a rearwardly extending and downwardly offset arm 296 (Figs. 10 and 13) which is disposed between pins 297 and 298, on a bracket 299 extending forwardly from the adjacent standard 4.

As shown in Fig. 10, when the feed carriage is in its forward position and rod 281 is beneath the stemming tube, arm 296 is engaged with pin 297 so that the scissors 291 are open to receive the pear. As the carriage moves rearwardly to the position illustrated in Fig. 13, in which the rod 281 is aligned with the coring mechanism, the arm 296 engages the pin 298 so that the scissors are closed and shear off the stem end of the pear immediately at the top of the cut made by the vertical knives 288. Because of the vertical cut made by the knives 288, the cut off portion of the stem of the pear is in two pieces and will fall off the rod 281.

From the above description, it is seen that, after the peeling operation, the pears have their stem ends cut off and are transferred to a position beneath the coring mechanism, which will now be described.

CORING MECHANISM
Coring knife

The coring knife 66 (Figs. 7, 8, 9 and 32) is mounted on a knife holder 301, which at its enlarged upper end is provided with parallel slots to receive spaced extensions 302 of a collar 303, a pivot pin 304 providing for relative pivotal movement therebetween for a purpose referred to hereinafter. Collar 303 is secured on the lower end of a vertically extending drive shaft 305, which is journalled in vertically spaced bosses 306 of a bracket 307, which is suitably secured on the post 72. At its upper end, shaft 304 carries a bevel pinion 308, meshing with a bevel gear 309, on a transverse shaft 311, which is journalled in aligned horizontal bosses 312 of the bracket 307. The shaft 311 also carries a small sprocket wheel 313 which is driven through chain 314 (Fig. 2) from a sprocket 315 on the camshaft 18. From the foregoing description, it will be seen that the coring knife 66 is rotated rapidly during the operation of the machine, and, as will now be described, it can be oscillated inwardly and outwardly with reference to its axis of rotation from its inactive central position, shown in full lines in Fig. 7, to an active coring position shown in dotted lines.

For the above described purpose, the holder 301 carries a pair of rollers 321 and 322, which are journalled on vertically offset horizontal axes and engage between plates 323 and 324, secured in spaced relation on vertical rods 326. Rods 326 are slidably mounted in suitable apertures in the bracket 307, and at their upper ends are provided with adjusting nuts 327 which position the rods with respect to brackets, and, correspondingly, the plates 323 and 324 with reference to the rollers 321 and 322. The plates 323 and 324 are resiliently held in their position by compression springs 328, positioned about the rods 326 between brackets 307 and the fastening nuts for the rods 326. In the position illustrated in Fig. 32, the plates 323 and 324 are held in their lower position by the springs 328 and the coring knife 66 is maintained in its central inactive position. It will be noted that in the inactive position of the coring knife 66 (Fig. 7) that axis A of shaft 305 intersects the coring knife, so that the rotation thereof is gyratory. Further, the radii of rotation of the tip of the knife and the apex of its arc are equal so that the path of rotation of the knife, when idle, is of a minimum diameter. This is important as it enables the coring knife to enter a stemming aperture of minimum diameter without enlarging the aperture. After penetration to the core or seed cells, the knife is moved outwardly for translatory rotation about the axis A by upward movement of the plates 323 and 324, so that the holder 301 will be rocked about its pivotal axis 304 in a counter-clockwise direction, to move the coring knife 66 to active position. The means for effecting such movement is associated with the coring clamps, which will now be described.

Coring clamps

The coring clamps associated with each coring knife are in the form of square cup shaped members, which face each other, and are pivotally mounted for movement to and from fruit engaging position so as to center the fruit from top to bottom as well as by the circumference. The centering is effected by the engagement of the clamps with the large part of the pear so that the core or seed cells of the pear are located substantially centrally of the coring clamps. The clamps are also mounted for vertical movement between the position shown in Figs. 32 and 34 and that shown in Fig. 35.

As previously described, the coring clamps operate to pick up a pear from the transfer rod 281 and present the same to the coring knife 66, after which they again descend to place the pear on the slicing mechanism as will be later described.

The coring clamps 331 (Figs. 32 and 33) are integrally secured at the ends of arms 332, and are generally L-shaped, having bosses 333 at the upper end of their vertical portions, which receive pivot pins 334 secured on a plate 336. Bosses 333 of the clamp arms have respective inter-engaging portions 337, which are provided with a suitable pivotal and slidable connection so as to provide for simultaneous movement of the clamps 331 to and from holding position. The clamps are resiliently urged to clamping position by tension springs 338 extending between a plate 336 and respective extending arms 339 of the clamp arm bosses 333. Each pair of clamps is supported for vertical movement by means of a bracket 341 which is secured to the plate 336 and is also secured to a flange 342 formed at the upper end of the sleeve 71. As previously described, the sleeve 71 is mounted for vertical sliding movement on the post 72, and consequently the clamps will also move vertically in timed relation to the other operating parts of the machine as controlled by the cam follower arm 73.

To control the movement of the coring knife to active position in accordance with the size of the fruit being cored, each clamp arm 333 is provided with an upwardly extending adjustable rod 346, the upper end of which is engageable with an inclined cam surface 347, integrally secured beneath the plate 324. It will be noted that the clamps 331 will be positioned different distances apart in accordance with the size of the pear and that consequently rod 346 will engage the cam surfaces 347 at different positions in accordance with the size of pear. Consequently, they will impart different extent of movement to the plates 323 and 324, and at different times in the travel of the clamps so that the coring knife will penetrate a different distance for each diameter of pear, and each pear will be cored in accordance with its diameter. Also, by adjusting the rods 346 the outward movement of the coring knife can be selected for the size of pears being processed.

Figure 33:
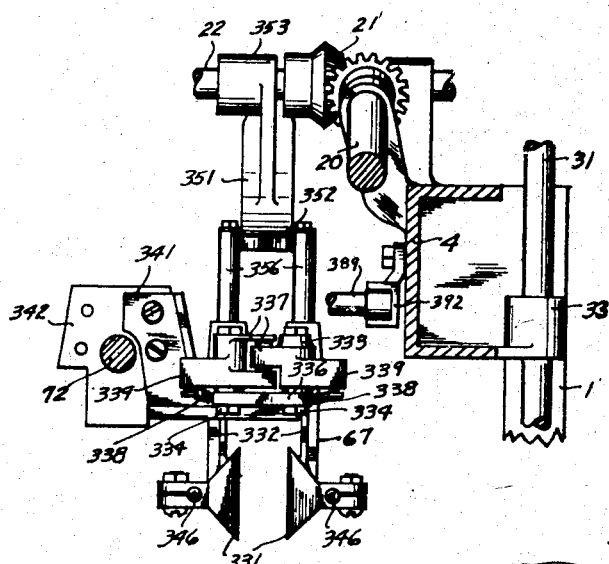
Fig. 33 is an enlarged plan view of the coring mechanism.

Means are provided for automatically opening and closing the coring clamps at the proper time in relation to the other operating parts, and such means may take the form of a cam sector 351 (Figs. 2, 6 and 33) having tapered ends 352 and mounted by a boss 353 on the transverse shaft 22. In the lower position of the coring clamps, cam sector 351 is adapted to engage between rollers 356 mounted on rearward extensions of the clamp arms 332, to separate such arms as illustrated in Figs. 33 and 35. This operation takes places just as the coring clamps reach their lower position and have centered the pear on the splitting mechanism as will be described. The clamps are held open until the rod 281 of the transfer mechanism has positioned another pear therebetween, when they close upon the pear and lift it into engagement with the coring knife, which penetrates through the hole left by the stemming tube and is then expanded to cut out the core. After the core is cut out and the clamps begin their descent, the coring knife returns to its central position to avoid enlarging the hole at the calyx end as the pear leaves the coring knife.

SPLITTING MECHANISM

As explained in the general description, the splitting mechanism comprises a splitting frame which is movable with the feed carriage to and from alignment with the coring mechanism, and a splitting station, where pusher means operate to force the pear past the splitting blade. The splitting frame 361 (Figs. 1 and 10) is generally cylindrical, and has an elongated side providing opposed apertured extensions 362, which engage on either side of vertical boss 363 of the frame and are pivotally connected thereto by means of a pin 364. The swinging movement of the frame 361 is limited in one direction by an adjustable stop screw 366, adapted to engage the standard 4, and in the other direction by a rubber bumper 367, or the like, which is adapted for engagement with the cross bracket 3 of the frame.

The cylindrical portion of frame 361 is provided with a horizontal flange or seat 368, on which a flanged cylindrical splitting knife holder 371 is seated. Holder 371 carries a central spindle or rod 372 to receive the pear from the coring mechanism and aligned knives 373 for splitting the pear in half. Frame 361 is provided with an extension 376 in which the lower end of rod 372 is mounted.

As previously described, the movement of the feed carriage controls the to and fro movement of the splitting frame, and for this purpose an arm 377 extends inwardly from the adjacent shaft 31 of the feed carriage, and has pivotally connected thereto at 378 a link 379 which is slotted at its outer end to engage over stud 380 on the frame 361. The slotted connection allows a more limited movement for the slicing frame 361, while it is still controlled and timed by the movement of the feed carriage.

As previously explained, in the forward position of the slicing frame (see Figs. 10 and 34) the rod 372 is aligned with the coring knife 66 to receive a pear from the coring clamps, and in its rearward position (see Figs. 5 and 13) it is associated with pusher means for effecting the slicing operation. Such pusher means comprises arm 381 (Figs. 1 and 5), which is pivoted intermediate its ends at 382 on bracket 383, extending upwardly from the frame bracket 3. At its forward end, arm 381 is provided with a split pusher foot 386 to engage on either side of the rod 372 and its other end is pivotally connected at 387 (Fig. 5) with a link 388 extending upwardly and pivotally connected with a shaft 389, which is secured in a depending apertured lug 391 (Fig. 4) of the sleeve 71. The respective enlarged ends of the shaft 389 (Figs. 4 and 6) are received in vertical guideways provided by guide members 392 secured to the inner faces of the standards 4. Shaft 389, therefore, not only serves to operate the pusher means to effect the slicing operation, but also serves to maintain the sleeve 71 in the proper position so that the coring clamps 67 remain properly related to the coring knives 66.

HAND FED SPLITTING MECHANISM

If desired, the pear machine of my invention can be equipped with a hand fed splitting mechanism, which is automatically operated in timed relation to the other parts of the machine. Generally, this modified splitting mechanism may comprise a tray to which the pears are fed from the coring mechanism and from which they are taken by an operator and placed on a splitting mechanism.

A tray 401 is mounted by suitable fastening studs to the rear faces of the standards 4 and from beneath each coring mechanism a trough 402 leads to the tray 401. Each trough 402 may be formed of arcuate end pieces 403, between which spaced parallel rods 404 extend.

The splitting mechanism comprises a splitting blade structure and pusher means generally similar in construction and operation to those previously described. The splitting means includes a bracket 406, which is suitably secured to the adjacent standard core, and is provided with a cylindrical portion 407 in which a splitting frame 408 is mounted. Centrally of the frame 48, a central aligning spindle or rod 409 is mounted, and has its lower end supported at 410 in an offset arm 411 of the bracket 406. Aligned splitting blades 410 extend from the spindle 409 to the frame 408 to split the pear into halves.

The pusher means includes split pusher foot 416, at the upper end of a lever 417, pivoted at 418 on the base 1 of the frame and having a suitable connection at 419 intermediate its ends with a link 420. The other end of link 420 is connected at 421 with an arm 422 which is secured to the adjacent shaft 31 of the feed carriage.

From the above description it will be evident that at each reciprocation of the feed carriage, the pusher 416 will be operated to force any pear on the spindle 409, past the splitting blades 412, from which the halves fall into any suitable receptacle.

Operation

The operation of the machine will be described with reference to the progress of a pear through the various successive operations thereon as they occur in the machine. Referring to Fig. 38, this figure shows a timing and operation diagram of the various parts of the machine, including graphs which illustrate the rate of movement of the various carriages and correspondingly of the mechanisms carried thereby. Reading horizontally from left to right, the diagram shows one complete cycle of operation, which corresponds to a 360° rotation of the various controlling cams with the parts as positioned when a pear is fed to the machine, that is, with the feed carriage and the other operative parts in the position shown in Fig. 10. For convenient reference, the various lines of the diagram have been lettered from a to r, and the mechanisms have been grouped with relation to the carriage which controls their movement.

The operator places a pear stem end down in the centering and feeding means as it moves from the position shown in Fig. 13 to that shown in Fig. 10. The centering clamps 110 and 111 are latched open by the latch lever 131 during this movement, and are released just before the end of the carriage movement by the trip 136, as indicated in line b of Fig. 38. It will be recalled that in placing the pear in the feed mechanism, the stem end thereof is centered by the cone shaped cup 108, while the clamps 110 and 111 when they close center the calyx end thereof with reference to the exterior contour. The feed carriage moves rapidly from the position shown in Fig. 10 to that shown in Fig. 13, as shown by the steep descending line of the feed carriage movement from the left of Fig. 38, the entire movement being completed in less than 60° of rotation of the controlling cam, after which the feed carriage remains in such position for approximately one-quarter of a cycle. During this time the stemming tube impales and picks up the pear from the feeding and centering mechanism.

Referring to line e of Fig. 38, showing the movement of the stemming carriage and correspondingly the movement of the stemming tube, it will be seen that at the beginning of a cycle of operation, the carriage is idle in its uppermost position and then moves rapidly down, this movement starting before the feed carriage has reached its impaling position. The spacing of the stemming tube on its carriage is such that actual impaling of a pear will not begin until the feed carriage comes to rest, that is, until approximately the 60° position as shown in Fig. 38, when the stemming tube will begin to enter the pear at the calyx end. Shortly after the stemming tube enters the pear and before the fins thereon have engaged the pear, the centering clamp release cam 143 (see line i, Fig. 38) engages the roller 142 to open the centering clamps, and their latch 131 becomes effective to maintain this position. Subsequent to this time, the impaling operation continues so that the fins 169 of the stemming tube will enter the pear tending to act as screw threads as previously explained, while the increasing radial depth of the fins provides a wedging action to hold the pear securely on the tube.

Immediately after the pear is completely impaled as seen in line e, the stemming carriage moves up rather rapidly to the point where the peeling operation will begin, that is, until the pear reaches the position shown in dotted lines in Fig. 1, where the knife 61 is just engaged with the calyx end. Thereafter, the movement of the stemming carriage slows down during peeling of the calyx end, the peeling knife controlling cam shown in line g becoming effective to turn the knife over as it peels around the large end of the pear, that is, until the knife will have traveled from the position shown in Figs. 1 and 28 to that shown in Figs. 30 and 34. The initial peeling operation is performed by the trailing section 233, and then as the knife is turned by the middle section 232 until the knife reaches the position shown in Fig. 30. Thereafter, the peeling operation continues with the leading cutting section 231 effective for the remainder of the peeling operation on the stem portion, during which time the pear moves more rapidly from the approximate 200° position of the stemming carriage in Fig. 38 to the 330° position thereof, that is, until the peeling knife throw-out cam, whose operation is illustrated in line H, becomes effective to move the knife out from the fruit as shown in Fig. 35.

Prior to this time, and just after the peeling of the calyx end, the calyx trimming knife becomes effective for a short time at approximately the 210° position of the stemming carriage (see line j of Fig. 38). This timing is not critical, except that it should be after the peeling knife has completed the part of the peeling operation in which it tends to force the pear off the stemming tube. This composite control of the peeling knife is shown in line K of Fig. 38.

Just prior to the completion of the peeling operation, the stem ejector becomes active to eject the severed portion of the stem, calyx and core from the stemming tube, as indicated in line O. Also, during the time that the knife is traveling out, the pusher foot 266 becomes active and moves down rapidly as indicated at the right end of line M in Fig. 38, while the stemming carriage is moving up, so that the pear is pushed off the stemming tube and is guided by the stem ejector onto the spindle 281 of the transfer and trimming mechanism which moves with the feed carriage and at this time is aligned with the stemming tube.

With reference to line c of Fig. 38 it will be noted that this transfer occurs just at the beginning of a second cycle of operation, when the trimming scissors are open, this condition obtaining until adjacent the end of the feeding movement of the carriage when the scissors are closed to trim off the stem end. It will be noted that the scissors are closed just prior to the time that the spindle 281 moves into alignment with the coring knife. During this time, the coring clamps are in their lower position as illustrated by the horizontal line showing the movement of the coring carriage in line m, the cam 351 being effective to hold the coring clamps open as the pear on the rod 281 moves in between the clamps after about 90° of the cycle.

While the feed carriage is idle, the coring clamps close as shown in line o, and start travelling up as shown in line m to their upper position for the coring operation, the coring knife entering the hole in the calyx end of the pear while in its inward position with reference to its axis of rotation. Just before the coring clamps reach their upper position, rods 346 thereon engage the cams 347 (Fig. 32) to move plates 323 and rock the coring knife out into active position. The coring clamps are in their uppermost position from about the 170° position thereof to the 270°, during which time the coring operation takes place. As the coring clamps begin to descend from the position shown in Fig. 34, the coring knife moves inwardly to its inactive position, and as the coring clamps complete their descent, at the end of the cycle of operation, the rod 372 of the splitting mechanism is moved into alignment with the aperture in the pear. At the beginning of the next cycle, the cam 351 becomes effective to open the coring clamps, as indicated in line q, so that the pear is dropped from the coring clamps onto the rod 372, which has a dwell in its movement provided by its lost motion connection with the feed carriage.

During the third cycle of operation, the splitting knife frame is moved from the position shown in Fig. 10 to that shown in Fig. 13 during which time it will be seen that the splitting pusher foot is idle as indicated in line 4. During the time that the splitting knife frame is substantially in the position shown in Fig. 13, the splitting pusher operates to force the pear down over the knives so that it is split into halves which can fall into any suitable receptacle.

Figure 37:
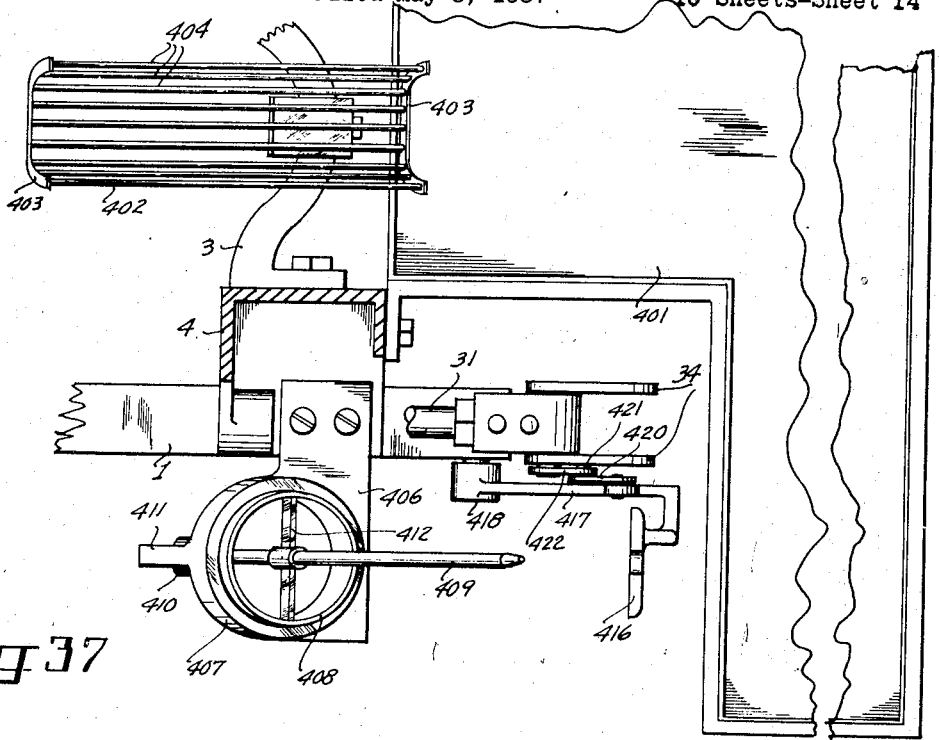
Fig. 37 is a plan view of such modified splitting mechanism and is taken in a plane indicated by the line 37—37 in Fig. 36.
Figure 36:
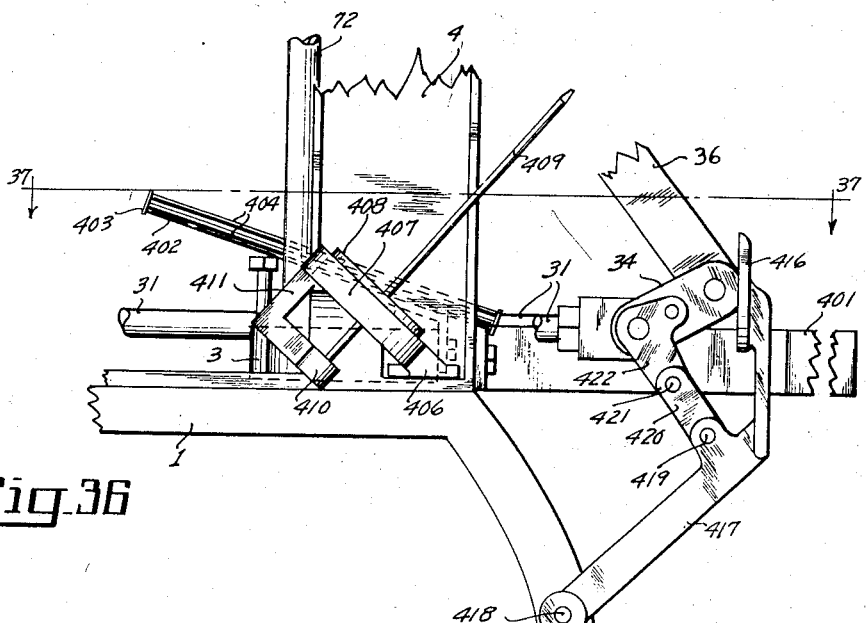
Fig. 36 is an elevation of a modified form of the splitting mechanism.

The operation with modified form of splitting mechanism shown in Figs. 36 and 37 is similar xcept that the pear is placed manually on the splitting mechanism.

While the complete processing of a pear entails three successive cycles of operation of the machine, it will be recalled that the pears are fed successively in two series through similar processing mechanism, so that when the machine is operating, six pears are being processed simultaneous, that is, two pears are being stemmed and peeled, two are being cored, and two are being split.

It is to be understood that although the particular embodiment illustrated and described is designed primarily for operating on pears, its application is not necessarily confined thereto, and the invention may be used with other fruits, with or without modification, and without departing from the spirit of the invention. I consider myself entitled to all such uses, modifications and variations as fall within the spirit and the scope of the claims appended hereto.

I claim:

1. In a pear preparation machine, a rotatable fruit impaling tube having substantially radially extending fins secured in spiral relation thereon, fruit feeding means for presenting fruit in centered relation and calyx end first to said tube, said feeding means including a rotatable cone-shaped cup for supporting the stem end of the fruit during impalement thereof and centering means for engagement with the calyx end of the pear to center the fruit on said cup, and means for moving said centering means out of engagement with the fruit after said tube has engaged the fruit but before engagement of said fins therewith.

2. In a fruit preparation machine, a rotatable fruit impaling tube having substantially radially extending fins secured in spiral relation thereon, fruit feeding means for presenting fruit in centered relation and calyx end first to said tube, said feeding means including rotatable means for supporting the fruit during impalement thereof and means for engaging and centering the fruit on said rotatable means, and means for moving said centering means out of engagement with the fruit after said tube has engaged the fruit but before engagement of said fins therewith.

3. In a pear preparation machine, a rotatable fruit impaling tube having substantially radially extending fins secured in spiral relation thereon, fruit feeding means for presenting fruit in centered relation and calyx end first to said tube, said feeding means including a rotatable cone-shaped cup for supporting the stem end of the fruit during the impaling operation, and also including opposed jaws for centering the calyx end of the fruit by engaging opposite sides of said calyx end, and means for opening said jaws after said tube has engaged the fruit but before engagement of said fins therewith.

4. In a fruit preparation machine, a rotatable fruit impaling tube having substantially radially extending fins secured in spiral relation thereon, fruit feeding means for presenting fruit in centered relation and calyx end first to said tube, said feeding means including rotatable means for supporting the stem end of the fruit during the impaling operation, and also including opposed jaws for centering the calyx end of the fruit by engaging opposite sides of said calyx end, and means for opening said jaws after said tube has engaged the fruit but before engagement of said fins therewith.

5. In a fruit preparation machine, a fruit impaling tube having substantially radially extending fins secured in spiral relation thereon, said fins increasing in radial depth from the fruit entering ends thereof.

6. In a fruit preparation machine, a fruit impaling tube having substantially radially extending fins secured thereon, said fins having a spiral trend to enable them to penetrate the fruit screw fashion, a peeling knife mounted for peeling engagement with fruit impaled on said tube, and means for rotating said tube in such direction relative to the spiral trend of said fins that the frictional engagement between the fruit and the peeling knife tends to turn the fruit in a direction to cause it to move further onto the tube.

7. A knife for peeling engagement with a pear with its cutting edge lying substantially in a plane containing the stem-blossom axis of the pear, comprising a generally arcuate blade having a central cutting edge portion of relatively small curvature, and having end cutting edge portions of greater curvature than said central portion, said cutting edge portions acting successively during peeling of a pear.

8. In a pear preparation machine, the combination with a rotatable fruit support, of a peeling knife having its cutting edge formed with portions of varying curvature, means for effecting relative movement between said support and said knife during the peeling operation in a direction extending axially of said support, and means for oscillating said knife about an axis perpendicular to the axis of said support to bring said cutting edge portions of varying curvature successively into operation during relative movement between said knife and said support, said movement effecting means including means for speeding up said movement during peeling of the stem portion of a pear.

9. In a pear preparation machine, the combination with a rotatable fruit support, of a peeling knife having its cutting edge formed with portions of varying curvature, means for effecting relative movement between said support and said knife during the peeling operation in a direction extending axially of said support, and means for oscillating said knife about an axis perpendicular to the axis of said support to bring said cutting edge portions of varying curvature successively into operation during relative movement between said knife and said support, said movement effecting means providing for a relatively slow movement while said knife peels around the calyx end of a pear and for a relatively faster movement while said knife peels along the stem portion of the pear.

10. A fruit transfer device for a pear preparation machine, comprising a support for receiving pears stem end first and movable between a fruit receiving position and a fruit delivering position, knife means on said support for splitting the stem ends of fruit received on said support in the direction of the stem-blossom axis, and a pair of scissors on said support operatively related to said knife means for cutting off the stem ends of pears received on said support transversely of said axis at the upper end of the split made therein by said knife means.

11. A fruit transfer device for a pear preparation machine, comprising a support movable between a fruit receiving and a fruit delivering position, an upright rod on said support to penetrate the central apertures of stemmed pears, vertically disposed knife means on said support at the base of said rod for splitting the stem ends of pears received on said rod, and a pair of scissors on said support for cutting off the stem ends of pears on said rod at the upper end of the split made therein by said knife means, said scissors being recessed to embrace said rod.

12. A fruit transfer device for a pear preparation machine having a stemming tube for penetrating through a pear to provide a central aperture therein, comprising a support movable between a fruit receiving position aligned with said stemming tube and a fruit delivering position, an upright rod on said support to penetrate the central apertures of stemmed pears, and a pair of scissors on said support for cutting off the stem ends of pears on said rod, said scissors being recessed to embrace said rod.

13. A fruit transfer device for a pear preparation machine having a stemming tube and a coring mechanism with spaced apart axes, comprising a fruit carrying rod movable back and forth into and out of alignment with said tube and said coring mechanism to transfer fruit in centered relation from said tube to said coring mechanism, and means associated with said rod for cutting off the stem ends of fruit during transferring movement thereof.

14. A fruit transfer device for a pear preparation machine having a stemming tube and a coring mechanism with spaced apart axes, comprising a fruit support movable back and forth into and out of alignment with said tube and said coring mechanism to transfer fruit in centered relation from said tube to said coring mechanism, and means associated with said support for cutting off the stem ends of fruit during transferring movement thereof.

15. A fruit transfer device for a pear preparation machine having a stemming tube and a coring mechanism with spaced part axes, comprising a fruit carrying rod movable back and forth into and out of alignment with said tube and said coring mechanism to transfer fruit in centered relation from said tube to said coring mechanism, and a pair of scissors associated with said rod for cutting off the stem ends of fruit during transferring movement thereof.

16. A fruit transfer device for a pear preparation machine having a stemming tube and a coring mechanism with spaced apart axes, comprising a fruit support movable back and forth into and out of alignment with said tube and said coring mechanism to transfer fruit in centered relation from said tube to said coring mechanism, and a pair of scissors associated with said support for cutting off the stem ends of fruit during transferring movement thereof.

17. In a pear preparation machine, a stemming tube for impaling a pear from the calyx end thereof, a coring mechanism including a coring knife having its axis parallel to the axis of said tube, pear transferring means movable back and forth into and out of alignment with said tube and said knife, a pear support on said transferring means for receiving pears stem end first and in centered relation from said stemming tube and maintaining the centered relation during transfer thereof to the coring mechanism, scissor means carried by said transferring means for cutting off the stem ends of pears transferred thereby, and means operating said scissor means during operative movement of said pear transferring means.

18. The combination with pear peeling knife means comprising a knife arm, bracket means on said knife arm, and a knife secured to said bracket means with its cutting edge projecting outwardly therefrom, said cutting edge defining the width of said knife means engageable with a pear and having portions of varying curvature; of means for mounting and controlling said knife means to move through a path conforming to the outline of a pear and to cause said cutting edge portions to act successively in peeling different portions of the pear.

19. The combination with pear peeling knife means comprising a knife arm, bracket means on said knife arm, and a knife secured to said bracket means with its cutting edge projecting outwardly therefrom, said cutting edge defining the width of said knife means engageable with a pear and having portions of varying curvature; of means for mounting and controlling said knife means to move through a path conforming to the outline of a pear and to cause said cutting edge portions to act successively in peeling different portions of the pear, said mounting and controlling means including means providing for inward and outward movement of said knife relative to the pear in response to variations in the contour of the pear.

20. In a pear preparation machine, a rotatable fruit support for impaling a pear axially thereof, a peeling knife having a central curved cutting edge portion and end cutting edge portions of greater curvature than said central portion, one of said end portions having a greater curvature than the other, means providing relative movement between said knife and support in a direction axially of the impaled fruit, and means for mounting and controlling said knife relative to a pear on said support to first engage the end portion of the knife having the least curvature with the calyx end of the pear to start the peeling operation, then to turn said knife to bring the central portion thereof into operation in peeling around the bulb of the pear, and finally to turn the knife to bring the end portion having the greatest curvature into peeling engagement with the pear at the concavity thereof between the bulb and the stem portions.

21. In a pear preparation machine, the combination with a rotatable fruit support for impaling pears calyx end first; of a peeling knife comprising a generally arcuate blade having a central cutting edge portion of relatively small curvature and end cutting edge portions of greater curvature than said central portion; means providing relative movement between said knife and support in a direction axially of the impaled fruit; means for mounting said knife, and control means for actuating said knife mounting to guide said knife relative to a pear on said tube to first engage one end portion thereof immediately adjacent the calyx of said pear to start the peeling operation, then to turn said knife to bring the central portion thereof into operation in peeling around the bulb of the pear, and finally to turn the knife to bring said other end portion into peeling engagement with the pear at the concavity thereof between the bulb and the stem portions, means operative at the end of the peeling operation for moving said knife mounting away from said support out of operative relation with said control means, and yieldable means for maintaining the adjusted position of said knife relative to said control means while out of operative relation therewith.

22. In a pear preparation machine a rotary fruit support for supporting a pear impaled calyx end first thereon, a peeling knife, means for effecting relative movement between said knife and support in a direction axially of the impaled pear, said peeling knife being mounted to engage and traverse said pear from its calyx end to its stem end during such relative movement, a yieldable calyx trimming knife mounted independently of said peeling knife for engagement with the calyx end of said pear and adapted to penetrate the pear as the latter is brought into engagement therewith and cut a central depression in the pear around the support as the latter rotates the pear, and means mounting said trimming knife to hold it out of engagement with the pear during the initial portion of the peeling operation and to position it for operative engagement with the calyx end of the pear thereafter during the peeling operation after the peeling knife has traversed beyond the lateral outward extremity of the bulbous portion of the pear, whereby the pressure of the peeling knife against the pear opposes the tendency of the trimming knife to push the pear off said support.

BURTON C. COONS.